(12) United States Patent
Manohar et al.

(10) Patent No.: US 9,524,270 B2
(45) Date of Patent: Dec. 20, 2016

(54) OPERAND-OPTIMIZED ASYNCHRONOUS FLOATING-POINT UNITS AND METHOD OF USE THEREOF

(71) Applicants: Rajit Manohar, Ithaca, NY (US); Basit R. Sheikh, Ithaca, NY (US)

(72) Inventors: Rajit Manohar, Ithaca, NY (US); Basit R. Sheikh, Ithaca, NY (US)

(73) Assignee: Cornell University, Ithaca, NY (US)

( * ) Notice: Subject to any disclaimer, the term of this patent is extended or adjusted under 35 U.S.C. 154(b) by 1010 days.

(21) Appl. No.: 13/663,970

(22) Filed: Oct. 30, 2012

(65) Prior Publication Data

US 2013/0124592 A1 May 16, 2013

Related U.S. Application Data

(63) Continuation-in-part of application No. PCT/US2011/034258, filed on Apr. 28, 2011.

(60) Provisional application No. 61/329,769, filed on Apr. 30, 2010.

(51) Int. Cl.
*G06F 17/10* (2006.01)
*G06F 7/485* (2006.01)

(52) U.S. Cl.
CPC .............. *G06F 17/10* (2013.01); *G06F 7/485* (2013.01); *G06F 2207/3864* (2013.01)

(58) Field of Classification Search
CPC ................ G06F 2207/3864; G06F 2207/3888
See application file for complete search history.

(56) References Cited

U.S. PATENT DOCUMENTS

| | | | |
|---|---|---|---|
| 5,111,421 A | 5/1992 | Molnar et al. |
| 5,327,369 A | 7/1994 | Ashkenazi |
| H001385 H | 12/1994 | Stickel et al. |
| 6,502,115 B2 | 12/2002 | Abdallah et al. |
| 6,529,928 B1 | 3/2003 | Resnick et al. |
| 6,697,832 B1 | 2/2004 | Kelley et al. |
| 6,965,313 B1 | 11/2005 | Saylor et al. |
| 7,693,930 B2 | 4/2010 | Karaki |
| 2003/0233622 A1 | 12/2003 | Nystrom et al. |
| 2004/0044716 A1 | 3/2004 | Colon-Bonet |
| 2006/0242219 A1 | 10/2006 | Chen et al. |
| 2008/0256161 A1 | 10/2008 | Quinnell et al. |
| 2010/0023574 A1 | 1/2010 | Rigge |
| 2010/0312812 A1 | 12/2010 | Wang |

OTHER PUBLICATIONS

Trabanpreuk, B. and Thongtak, A., "A Design of Asynchronous Dynamic Pipelined Floating-point Arithmetic Unit", 2005 2nd International Conference on Electrical Engineering/Electronics, Computer, Telecommunications and Information Technology (ECTI-CON 2005), pp. 795-798, 2005.*

(Continued)

*Primary Examiner* — Matthew Sandifer
(74) *Attorney, Agent, or Firm* — Burns & Levinson LLP; Orlando Lopez

(57) ABSTRACT

Asynchronous arithmetic units including an asynchronous IEEE 754 compliant floating-point adder and an asynchronous floating point multiplier component. Arithmetic units optimized for lower power consumption and methods for optimization are disclosed.

17 Claims, 30 Drawing Sheets

(56) References Cited

OTHER PUBLICATIONS

B. R. Sheikh and R. Manohar, "An asynchronous floating-point multiplier", 18th IEEE International Symposium on Asynchronous Circuits and Systems, pp. 89-96, May 2012.*
B. R. Sheikh and R. Manohar, "An operand-optimized asynchronous IEEE 754 double-precision floating-point adder", 16th IEEE International Symposium on Asynchronous Circuits and Systems, pp. 151-162, May 2010.*
International Search Report dated Jul. 11, 2011 for International Application No. PCT/US11/34258.
Written Opinion dated Jul. 11, 2011 for International Application No. PCT/US11/34258.
Beaumont-Smith, A. et al. Reduced Latency IEEE Floating-Point Standard Adder Architectures. Proceedings 14th IEEE Symposium on Computer Arithmetic, 1999, 35-42.
Bruguera, J. D. et al. Leading-One Prediction Scheme for Latency Improvement in Single Datapath Floating-Point Adders. International Conference on Computer Design: VLSI in Computers and Processors, Oct. 5-7, 1998, 298-305.
Corsonello, P. et al. A 56-Bit Self-Timed Adder for High Speed Asynchronous Datapath. The 6th IEEE International Conference on Electronics, Circuits and Systems, 1999, vol. 1, 37-41.
Efthymiou, A. et al. An Asynchronous, Iterative Implementation of the Original Booth Multiplication Algorithm. Proceedings. 10th International Symposium on Asynchronous Circuits and Systems, Apr. 19-23, 2004, 207-215.
Even, G. et al. On the Design of IEEE Compliant Floating Point Units. IEEE Transactions on Computers 49(5), May 2000, 398-413.
Fang, D. et al. Non-Uniform Access Asynchronous Register Files. Proceedings. 10th International Symposium on Asynchronous Circuits and Systems, Apr. 9-23, 2004, 78-85.
Ferreti, M. et al. Single-Track Asynchronous Pipeline Templates Using 1-of-N Encoding. Proceedings of the 2002 Design, Automation and Test in Europe Conference and Exhibition, 2002, 1008-1015.
Gurkaynak, F. K. et al. Higher RAdix Kogge-Stone Parallel Prefix Adder Architectures. The 2000 IEEE International Symposium on Circuits and Systems, 2000, vol. 5, 609-612.

Hensley, J. et al. A Scalable Counterflow-Pipelined Asynchronous Radix-4 Booth Multiplier. Proceedings. 11th IEEE International Symposium on Asynchronous Circuits and Systems, Mar. 14-16, 2005, 128-137.
Kahan, W. IEEE Standard 754 for Binary Floating Point Arithmetic. Lecture Notes on the Status of IEEE 754, Oct. 1, 1997, 1-30.
Khare, K. et al. Comparison of pipelined IEEE-754 standard floating point adder with unpipelined adder. J. Scientific & Industrial Research (64), May 2005, 354-357.
Khare, K. et al. Comparison of pipelined IEEE-754 standard floating multiplier with unpipelined multiplier. J. Scientific & Industrial Research (65), Nov. 2006, 900-904.
Liu, Y. et al. The Design of a Lower Power Asynchronous Multiplier. Proceedings of the 2004 International Symposium on Low Power Electronics and Design, Aug. 9-11, 2004, 301-306.
Martin, A. J. et al. The Design of an Asynchronous MIPS R3000 Microprocessor. Proceedings Seventeenth Conference on Advanced Research in VLSI, Sep. 15-16, 1997, 164-181.
Noche, J. R. et al. An Asynchronous IEEE Floating-Point Arithmetic Unit. Science Diliman (Jul.-Dec. 2007) 19 (2), 12-22.
Park, W-C. et al. Efficient Simultaneous Rounding Method Removing Sticky-Bit From Critical Path for Floating Point Addition. Proceedings of the Second IEEE Asia Pacific Conference on ASICs, 2000, 223-226.
Seidel, P-M. et al. On the Design of Fast IEEE Floating-Point Adders. Proceedings 15th IEEE Symposium on Computer Arithmetic, 2001, 184-194.
Sutherland, I. et al. GasP: A Minimal FIFO Control. Proceedings of the 7th IEEE International Symposium on Asynchronous Circuits and Systems, 2001, 46-53.
Thompson, J. et al. A 64-bit Decimal Floating-Point Adder. Proceedings of the IEEE Computer Society Annual Symposium on VLSI: Emerging Trends in VLSI Systems Design, 2004, 297-298.
Van Berkel, K. et al. Single-Track Handshake Signaling with Application to Micropipelines and Handshake Circuits. Second International Symposium on Advanced Research in Asynchronous Circuits and Systems, Mar. 18-21, 1996, 122-133.
International Preliminary Report on Patentability dated Nov. 6, 2012 for International Application No. PCT/US11/34258.

* cited by examiner

OPERAND-OPTIMIZED ASYNCHRONOUS FLOATING-POINT UNITS AND METHOD OF USE THEREOF

CROSS REFERENCE TO RELATED APPLICATIONS

This application is a continuation-in-part of International Patent Application No. PCT/US2011/034258, entitled OPERAND-OPTIMIZED ASYNCHRONOUS FLOATING-POINT UNITS AND METHOD OF USE THEREOF, filed on Apr. 28, 2011, which in turn claims priority to U.S. Provisional Application No. 61/329,769, filed Apr. 30, 2010, entitled OPERAND-OPTIMIZED ASYNCHRONOUS FLOATING-POINT UNITS, both of which are incorporated by reference herein in their entirety for all purposes.

STATEMENT REGARDING FEDERALLY SPONSORED RESEARCH OR DEVELOPMENT

This invention was made partially with U.S. Government support from the National Science Foundation under NSF grants CNS-0834582 and CCF-0428427. The U.S. Government has certain rights in the invention.

BACKGROUND

This invention relates generally to floating-point arithmetic units, and, more particularly, to IEEE 754 compliant asynchronous floating-point arithmetic units.

Efficient floating-point computation is important for a wide range of applications in science and engineering. Using computational techniques for conducting both theoretical and experimental research has become ubiquitous, and there is an insatiable demand for higher and higher performing VLSI systems. Today, this performance is limited by power constraints. The Top 500 supercomputer ranking now includes the energy-efficiency of the system as well as its performance. At the other end of the spectrum, embedded systems that have traditionally been considered low performance are demanding higher and higher throughput for the same power budget. Hence it is important to develop energy-efficient floating point hardware, not simply high performance floating-point hardware.

The IEEE 754 standard for binary floating-point arithmetic provides a precise specification of a floating-point adder (FPA). This specification was determined after much debate, and it took several years before hardware vendors developed IEEE-compliant hardware. Part of the challenge was the belief that: (i) implementing most of the standard was sufficient; (ii) ignoring a few infrequently occurring cases led to more efficient hardware. Unfortunately ignoring certain aspects of the standard can lead to unexpected consequences in the context of numerical algorithms. Today, most floating point hardware is IEEE-compliant or has an IEEE-compliant mode.

Therefore, there is a need to provide energy efficient IEEE 754 compliant floating-point arithmetic units.

BRIEF SUMMARY

In one embodiment, the asynchronous floating-point adder of these teachings includes a front end component receiving a first input and second input, the first and second input being described in exponent/significand form, the front end analyzing the first and second input and obtaining a difference between an exponent of the first input and an exponent of the second input, the difference being a difference in exponents, an alignment shift component receiving the difference in exponents, an adder component receiving adder inputs from the alignment shift component, a leading one predictor (LOP)/decoder component receiving adder inputs from the alignment shift component, a left shift/exponent adjustment determination component receiving an output of the adder component and an output of the leading one predictor/decoder component, a right shift/exponent adjustment determination component receiving an output of the adder component, a left-right selection component, an output of the left-right selection component being utilized to provide an output of the asynchronous floating-point adder, the front end component, the shifter component, the adder component, the leading one predictor (LOP)/decoder component, the left shift/exponent adjustment determination component, the right shift/exponent adjustment determination component and the left right-selection component utilizing quasi-delay insensitive (QDI) asynchronous circuits, the front end component, the alignment shift component, the adder component, the leading one predictor (LOP)/decoder component, the left shift/exponent adjustment determination component, the right shift/exponent adjustment determination component and the left right-selection component being asynchronously pipelined, asynchronously pipelining enabling optimization of operand. In one instance, optimization of the operand results in a more energy-efficient floating-point adder unit. Various embodiments of floating point adder units with optimized components are disclosed.

In another embodiment asynchronous fused multiply-adder unit of these teachings, the fused multiply-adder includes an alignment shifter receiving one adder input, a multiplier array receiving two multiplier inputs and an adder receiving a processed output of the alignment shifter and a multiplier array output, the alignment shifter, the multiplier array and the adder utilizing quasi-delay insensitive (QDI) asynchronous circuits, the alignment shifter, the multiplier array and the adder being asynchronously pipelined, asynchronously pipelining enabling optimization of the fused multiply-adder. Various embodiments of the fused multiply-adder of these teachings including components leading to optimization are disclosed.

In one or more embodiments, the floating-point multiplier of these teachings includes an unpacking component, the unpacking component unpacking a representation of multiplicands into sign, exponent and mantissa, an array multiplier component receiving mantissa bits for each input, the array multiplier generating partial products, providing the partial products to a number of carry-save adders and providing two bit streams as output, a carry propagation adder component receiving most significant bits of each of the two bit streams, a carry, round and sticky bit component receiving least significant bits of each of the two bit streams and a round and normalization component receiving output from the carry propagation adder and the carry, round and sticky bit component, a carry, round and sticky bit component receiving least significant bits of each of the two bit streams, and a round and normalization component receiving output from the carry propagation adder and the carry, round and sticky bit component, the array multiplier being asynchronously pipelined.

In one instance, a single track handshake protocol is used in each template in the asynchronous pipeline.

Embodiments of methods of these teachings for obtaining optimized floating-point arithmetic units are also disclosed.

For a better understanding of the present teachings, together with other and further objects thereof, reference is

DETAILED DESCRIPTION

Figure 1:
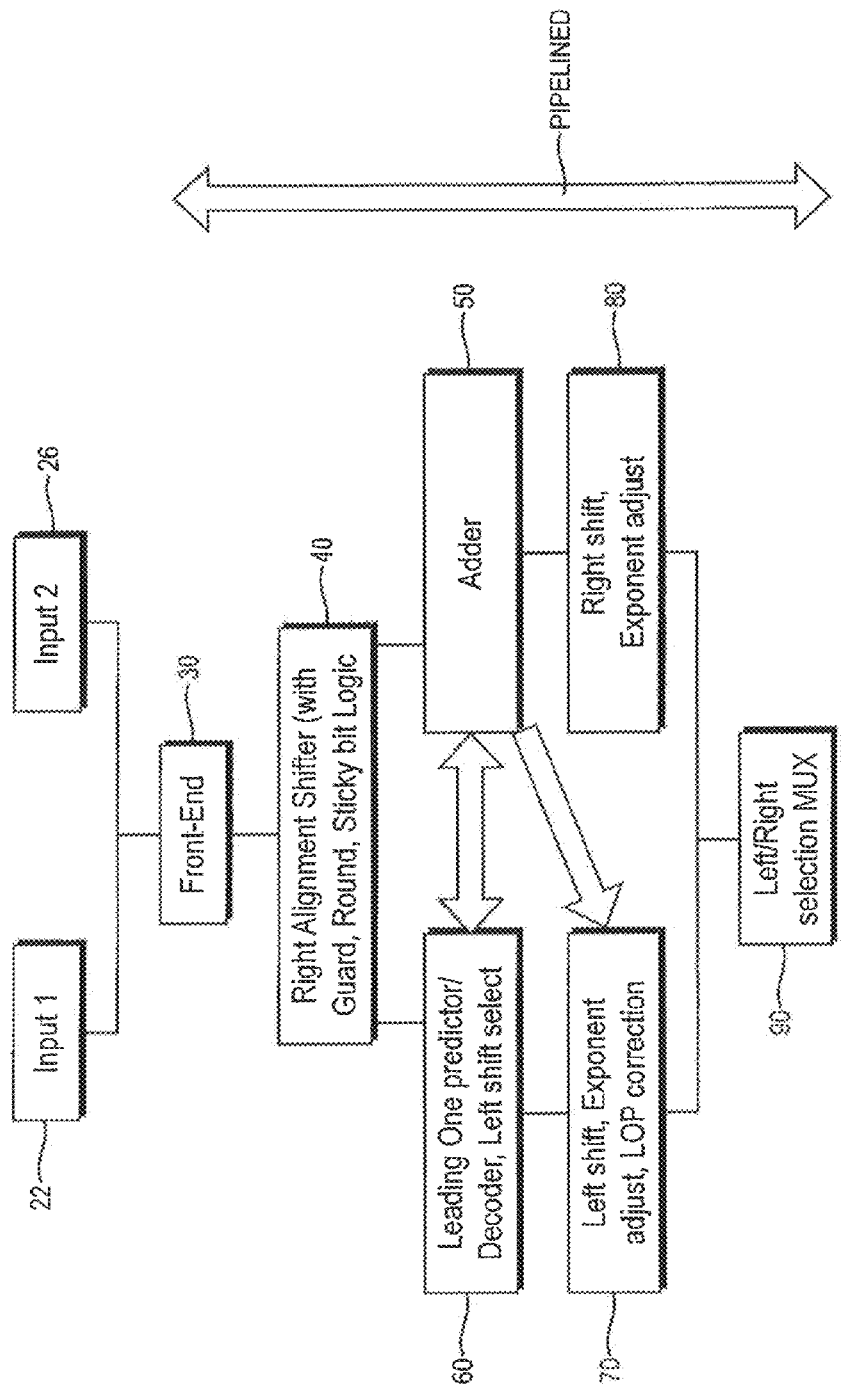
FIG. 1 is a schematic block diagram representation of one embodiment of the floating-point adder of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. The exemplary embodiments are presented throughout but it should be noted that the present teachings are not limited only to those exemplary embodiments.

The following information is provided to assist in describing these teachings.

A normalized floating point number according to the IEEE 754 standard is expressed in terms of a sign bit for a fraction, a fraction expressed in the form of absolute values, and e denotes the biased exponent. Note that 1.fraction is called the significand. In rounding operations, three types of bits are defined: Guard bit, Round bit, and Sticky bit. The Guard bit becomes the MSB of bits that are lost, Round bit becomes the second MSB, and the Sticky bit is the boolean ORed value of the rest of the bits lost (Woo-Chan Park, Tack-Don Han, Shin-Dug Kim; Efficient simultaneous rounding method removing sticky-bit from critical path for floating point addition, Proceedings of the Second IEEE Asia Pacific Conference on ASICs, 2000, AP-ASIC 2000, Page (s): 223-226, incorporated by reference herein in its entirety for all purposes).

Addition (or its inverse, subtraction) of floating point numbers, when represented in terms of a sign, exponent and significand, as shown below, $$(-1)^s 1.\text{significand} \times 2^{exponent-1023}$$

requires typically four steps:
  Alignment of the significands (mantissa) if the exponents are different;
  Addition of the aligned significands;
  Renormalization of sum if not already normalized; and
  Rounding of the sum.

The alignment step uses the guard bit and round bit and produces the sticky bit. The sticky bit is the "'or' of all the bits discarded during the alignment shift." (See, for example, Floating-point addition, available at users-tima.imag.fr/cis/guyot/Cours/Oparithm/english/Flottan.htm, accessed on Apr. 10, 2011, which incorporated by reference herein in its entirety for all purposes.)

A "pipeline," as used herein, is a device obtained when an input process is subdivided into a sequence of subtasks, each of these subtasks been executed by a hardware stage that operates concurrently with other stages. In an asynchronous pipeline, the stages can be in parallel in the pipeline.

A "token," as used herein, is a piece of data in transit in the pipeline.

A Quasi Delay-Insensitive QDI) circuit, as used herein, is an almost (substantially) delay-insensitive asynchronous circuits in which no assumptions are made about the delays of any of the circuit's wires or elements.

A ripple or ripple-carry adder circuit, as used herein, is an adder circuit having a number of adders. Each adder receives as input the carry output of the previous adder. In that circuit, each carry bit "ripples" to the next adder, and the circuit is called a ripple carry adder.

A floating-point adder is used for the two most frequent floating-point operations: addition and subtraction. It requires much more circuitry to compute the correctly normalized and rounded sum compared to a simple integer adder. All the additional circuitry makes the FPA a complex, power consuming structure. The following summarizes the key operations required to implement an IEEE-compliant FPA:

The first step in the FPA data path is to unpack the IEEE representation and analyze the sign, exponent, and significands bits of each input to determine if the inputs are standard normalized or are of one of the special types NaN, Infinity, Denormal)

The absolute difference of the two exponents is used as the shift amount for a variable right shifter which aligns the smaller of the operands.

In parallel with the right align shifter, the guard, round, and sticky bits are computed to be used for rounding in latter stages of the FPA data path.

The next step is the addition or subtraction of two significands based on sign information.

Most high-performance FPAs use a special-purpose circuit popularly known as a Leading-One-Predictor and Decoder (LOP/LOD) to predict the position of the leading one in parallel with the addition/subtraction step.

The post addition steps include normalizing the significands. This may require either a left shift by a variable amount (using the predicted value from LOP), no shift (if the output is already normalized), or a right shift by one bit (in case of carry-out when the addition inputs have the same sign).

The exponent is adjusted based on the shift amount during normalization. In parallel, the guard, round, and sticky bits are updated and are used, along with the rounding mode, to compute if any rounding is necessary. The sign of the sum is also computed.

In case of rounding, the exponent and significand bits are updated appropriately.

The final stage checks for a NaN (Not a Number), Infinity, or a Denormal outcome before outputting the correct result.

A number of synchronous floating-point adders have been disclosed and are in use. While a number of low latency synchronous floating-point adders have been proposed, there have been few attempts at low power synchronous floating point adders. Several asynchronous floating point adders have been disclosed but these designs are not pipelined and do not include energy optimization or operand optimization.

In one embodiment, the asynchronous floating-point adder of these teachings includes a front end component receiving a first input and second input, the first and second input being described in exponent/significand form, the front end analyzing the first and second input and obtaining a difference between an exponent of the first input and an exponent of the second input, the difference being a difference in exponents, an alignment shift component receiving the difference in exponents, an adder component receiving adder inputs from the alignment shift component, a leading one predictor (LOP)/decoder component receiving adder inputs from the alignment shift component, a left shift/exponent adjustment determination component receiving an output of the adder component and an output of the leading one predictor/decoder component, a right shift/exponent adjustment determination component receiving an output of the adder component, a left-right selection component, an output of the left-right selection component being utilized to provide an output of the asynchronous floating-point adder; the front end component, the shifter component, the adder component, the leading one predictor (LOP)/decoder component, the left shift/exponent adjustment determination component, the right shift/exponent adjustment determination component and the left right-selection component utilizing quasi-delay insensitive (QDI) asynchronous circuits; the front end component, the alignment shift component, the adder component, the leading one predictor (LOP)/decoder component, the left shift/exponent adjustment determination component, the right sift/exponent adjustment determination component and the left right-selection component being asynchronously pipelined, asynchronously pipelining enabling optimization of operand. In one instance, optimization of the operand results in a more energy-efficient floating-point adder unit. Various embodiments of floating point adder units with optimized components are disclosed hereinbelow.

The embodiment of the asynchronous floating point adder (FPA) of these teaching that is disclosed hereinbelow is a fully implementable (at the transistor-level) asynchronous double precis ion floating-point adder, supports all four rounding modes and is fully IEEE-754 compliant. FIG. 1 shows the block diagram of the data path of the below disclosed embodiment of the asynchronous FPA of these teachings.

Referring to FIG. 1, the embodiment of the asynchronous FPA of these teachings shown therein includes a front end component 30 receiving a first, input 22 and second input 26, the first and second input 22, 26 being described in exponent/significand form, the front end analyzing the first and second input and obtaining a difference between an exponent of the first input and an exponent of the second input, the difference being a difference in exponents. The front-end component 30 also unpacks the representation of the first and second input 22, 26 and analyzes the first and second input to determine if the inputs are standard normalized or are one of the three special types—NaN, infinity or Denormal. An alignment shift component 40 receives the difference in exponents (the guard, round and sticky bits are computed in parallel with the alignment shift). An adder component 50 receives adder inputs from the alignment shift component 40; a leading one predictor (LOP)/decoder component 60 receives adder inputs from the alignment shift component 40, a left shift/exponent adjustment determination component 70 receives an output of the adder component 40 and an output of the leading one predictor/decoder component 60. A right shift/exponent adjustment determination component 80 (also including rounding and an incrementer) receives an output of the adder component 40. The left shift/exponent adjustment determination component 70 constitutes a left pipeline section while the right shift/exponent adjustment determination component 80 constitutes a right pipeline section. A left-right selection component 90 receives the outputs of the left pipeline section 70 and the right pipeline section 80, an output of the left-right selection component 90 being utilized to provide an output of the asynchronous floating-point adder. The output of the left-right selection component 90 is packed into the sign/exponent/significand form.

In the embodiment shown in FIG. 1, to reduce latency and overall complexity, the post-addition normalization data path is separated in two paths. The Left path contains a variable left shifter, whereas the Right path includes a single-position right or left shifter along with all rounding and increment logic, as shown in FIG. 1.

Quasi-delay-insensitive (QDI) asynchronous circuits are used in the FPA design of these teachings. The data path of the baseline asynchronous FPA of these teachings is highly pipelined (in one instance, thirty pipeline stages are used, but this is not a limitation of these teachings) to maximize throughput. Unlike the standard synchronous pipelines, the forward latency of each asynchronous pipeline is only two logic transitions (the pull-down stack followed by the inverter), hence the multistage asynchronous pipeline depth results in acceptable FPA latency. The fine-grain asynchronous pipelines in the design of these teachings contain only a small amount of logic (for example, but not limited to, a two-bit full-adder). The actual computation is combined with data latching, which removes the overhead of explicit output registers. This pipeline style has been used in previous high-performance asynchronous designs (A. J. Martin, A. Lines, R. Manohar, M. Nystrom, P. Penzes, R. Southworth, U. V. Cummings, and T.-K. Lee. The Design of an Asynchronous MIPS R3000. In Proc. Conference on Advanced Research in VLSI, 1997, incorporated by reference herein in its entirety for all purposes). A Pre-charge enabled half-buffer (PCEBB) pipeline is used for all data computation (D. Fang and R. Manohar, Non-Uniform Access Asynchronous Register Files, Proc. IEEE International Symposium on Asynchronous Circuits and Systems, 2004, incorporated by reference herein in its entirety for all purposes). The PCEBB is a modified version of the original PCBB pipeline (A. Lines. Pipelined Asynchronous Circuits. Master's thesis, California Institute of Technology, 1995, CS-TR-95-21, incorporated by reference herein in its entirety for all purposes). SPICE simulations show the PCEBB pipelines of these teachings are faster and more energy-efficient than PCBB pipelines in a modern 65 nm process. For simple buffers and copy tokens, a weak-conditioned halfbuffer (WCBB) (A. Lines, Pipelined Asynchronous Circuits. Master's thesis, California Institute of Technology, 1995, CS-TR-95-21) pipeline stage, which is a smaller circuit than a PCEBB, and likely more energy-efficient for simple data buffering and copy operations, is used.

Hybrid Kogge-Stone Carry-Select Adder

The 56-bit significand adder is on the critical path of the FPA and is the single largest functional block in the FPA data path. Improvements in the adder design usually have the largest overall impact on the FPA. Tree adders like Kogge-Stone (P. M. Kogge and H. S. Stone. A Parallel Algorithm for the Efficient Solution of a General Class of Recurrence Equations, IEEE Transactions on Computers, C-22, August 1973, incorporated by reference herein in its entirety for all purposes) can compute any N-bit sum with a worst-case latency of O(log N) stages.

In one embodiment, referred to as the baseline embodiment, of the asynchronous FPA of these teachings, a hybrid KoggeStone/carry-select adder is used. The adder is partitioned into eight-bit Kogge-Stone blocks that compute two speculative sum outputs (assuming the carry-in is either zero or one). The sum output is selected by the final stage based on the actual carry values. The choice of eight bit Kogge-Stone sub-blocks was made for energy-efficiency as blocks with more bits would have resulted in higher energy due to long wiring tracks that have to run across the total width of the block. Most blocks in the adder use radix-4 arithmetic and Iof4 codes (like the adder in (A. J. Martin, A. Lines, R. Manohar, M. Nystrom, P. Penzes, R. Southworth, U. V. Cummings, and T.-K, Lee. The Design of an Asynchronous MIPS R3000. In Proc. Conference on Advanced Research in VLSI, 1997, incorporated by reference herein in its entirety for all purposes)) to minimize energy and latency.

Subtraction is done in the usual way by inverting the inputs and using a carry-in of one for the entire adder. The choice of significand to invert is important from the energy perspective Since IEEE floating-point uses a sign-magnitude representation, a final negative result requires a second two's complement step. To avoid this, the asynchronous FPA of these teachings chooses to invert the smaller of the two significands.

Most modern FPA implementations use Leading One Prediction/Leading One Decoding (LOP LOD) logic to determine the shift amount for normalization in parallel with the significand adder. This reduces the latency of the FPA, because the shift amount is ready when the adder outputs are available.

In one embodiment of the asynchronous FPA of these teachings, the LOP logic has some elements of the LOP scheme proposed by Bruguera et al. (D. Bruguera and T. Lang. Leading-One Prediction with Concurrent Position Connection, IEEE Transactions on Computers, Volume 48, Issue 10, October 1999, incorporated by reference herein in its entirety for all purposes). The LOP logic subtracts the two significands using a signed digit representation producing either a 0, 1, or −1 for each bit location. The bit string of 0s, 1s, and −1s can be used to find the location of the leading one, except that it could be off by one in some cases. Instead of using a correction scheme that operates in parallel with the LOP hardware (requiring significant more energy), the speculative shift amount is used and then optionally shift the final outcome by one in case there was an error in the estimated shift amount. This also requires an adjustment to the exponent. To make this adjustment efficient, both values of the exponent are computed concurrently by using a dual-carry chain topology for the exponent adder.

Figure 2:
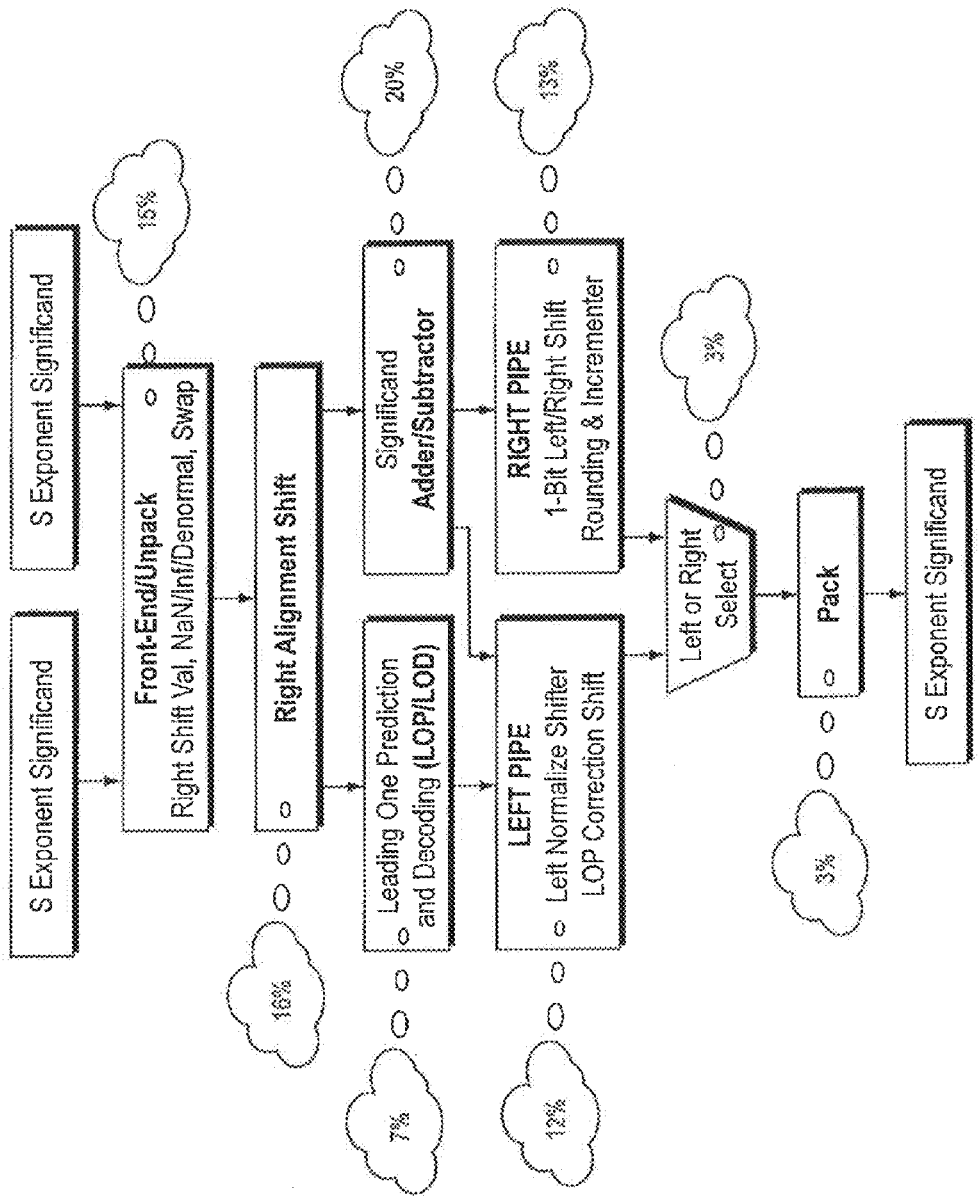
FIG. 2 is a schematic block diagram representation of one embodiment of the floating-point adder of these teachings displaying percentage of energy used in each block.

FIG. 2 shows a detailed energy/power breakdown of the FPA data path of FIG. 1, Starting with 15% of Front-End, each block is rated by the approximate percentage of power that it consumes. Since in asynchronous PCEHB and WCHB pipelines the actual percentage power usage of any particular functional block includes all pipeline overhead i.e. input validity, output validity and handshake acknowledge computation. Although, the Hybrid Kogge-Stone Carry-Select Adder is the largest power-consuming functional block in the pipeline, it is interesting to note that there is no single dominant high-power component in the FPA data path. Hence, any effective power-saving optimizations would require tackling more than one function block.

The Right-Align Shift block which comes second in terms of power-consumption includes logic to compute the guard, round, and sticky bits to be used in the rounding mode. In the worst case, the sticky bit logic has to look at all 53 shifted out bits. To do this fast and in parallel with the right-align shifter, considerable extra circuitry is needed which consumes more power. The post addition Right Pipeline block is the third most power-consuming component of the FPA data path. It includes the single position left or right shifter as well as complete rounding logic which includes significand increment logic and exponent increment/decrement logic blocks.

Most synchronous FPAs (limited by worst-case computation delay) include complex circuitry to attain constant latency and throughput for the best, average, and worst case input patterns, although the best and average additions could have been done much faster and more efficiently. The important question to ask is how often the worst-case happens. If it happens very frequently then it justifies burning extra power with complex circuits to boost overall performance.

To answer the question of how often the worst-case happens, Intel s PIN toolkit was used to profile input operands in a few floating-point intensive applications from SPEC2006 and PARSEC benchmark suites using reference input sets. The set of ten applications chosen for profiling came from very diverse fields such as quantum chemistry, speech recognition, financial services, molecular biology, 3D graphics, linear programming optimizations etc. The input operands in actual benchmark runs were saved to disk, and then used for statistical analysis. The application profiling statistics in the following sections were tabulated using ten billion input operands for each application.

Interleaved Asynchronous Adder

Figure 3:
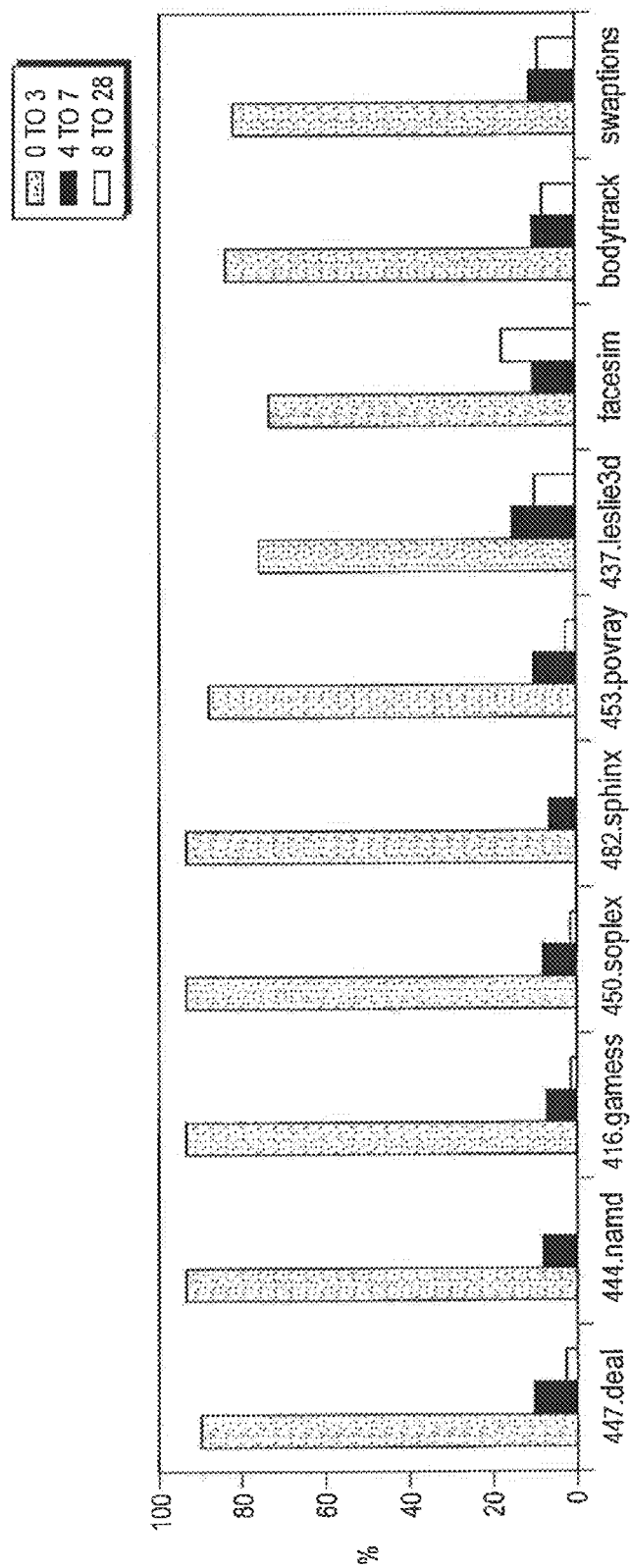
FIG. 3 is a graphical schematic representation of results for Radix-4 Ripple-Adder Carry-Length in a number of applications.

The delay of an N-bit adder primarily depends on how fast the carry reaches each bit position. In the worst-case, the carry may need to be propagated through all bits, hence synchronous implementations resort to tree adder topologies. However, as shown in FIG. 3, for most application benchmarks, almost 90% of the time the maximum carry-chain length is limited to 7 radix-4 positions An N-bit ripple carry asynchronous adder has an average case delay of $O(\log N)$, the same order as a more complex synchronous parallel-prefix tree adder such as Kogge-Stone. However, the use of ripple-carry asynchronous adders is not feasible for high-performance FPA circuits because the pipeline stage waiting for the carry input stalls the previous pipeline stage until it computes the sum and the carry-out. Even a delay of one carry-propagation (which is two gate delays) stalls the preceding pipeline by a significant amount.

Figure 4:
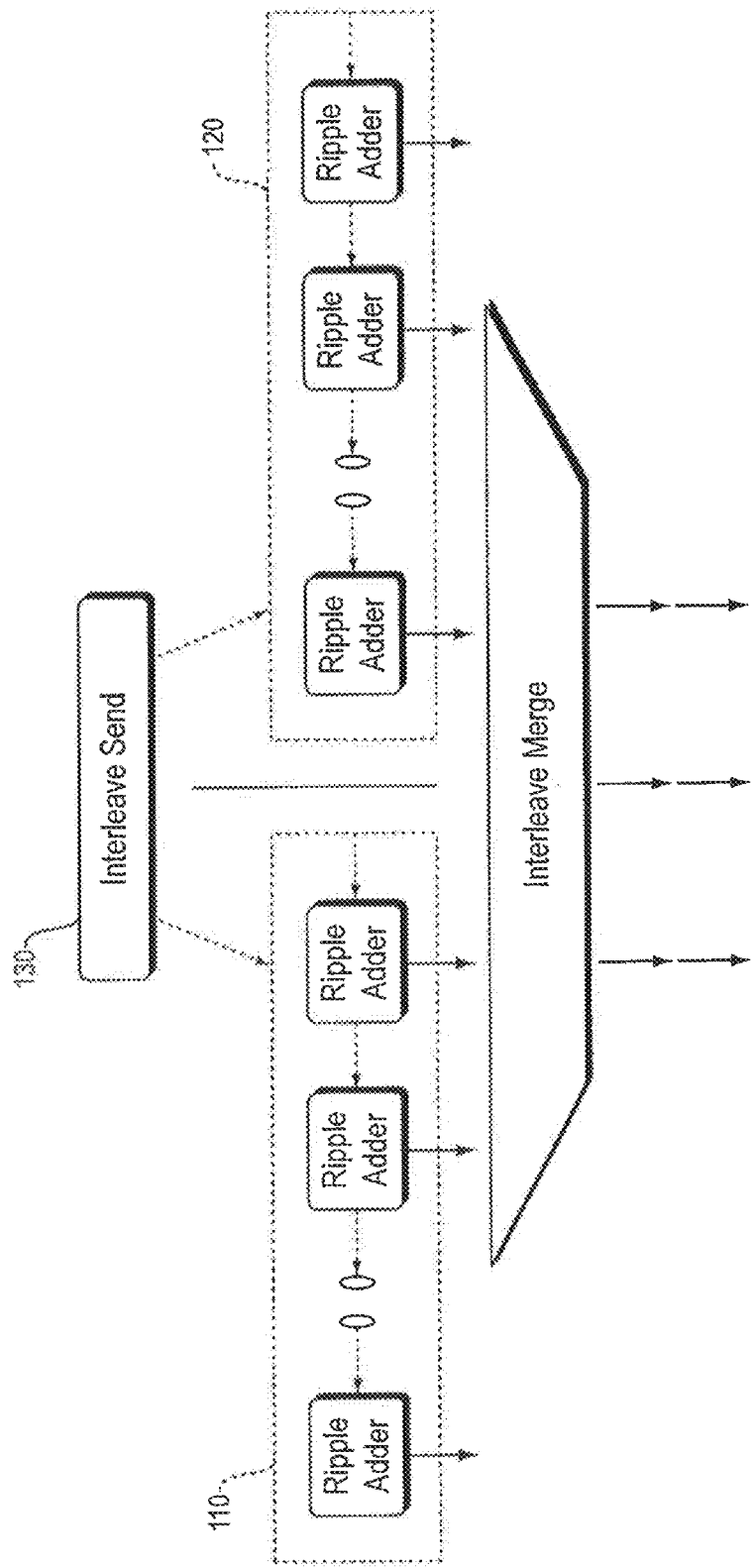
FIG. 4 is a schematic block diagram representation of one embodiment of the adder component of the floating-point adder of these teachings.

To circumvent the average throughput problem, in one embodiment, an interleaved asynchronous adder, such as the adder shown in FIG. 4, is used as the adder. The adder embodiment shown in FIG. 4 uses two asynchronous ripple-carry adders: the left 110 and right adders 120. In one instance, the left and right adders 110, 120 are radix-4 ripple-carry adders. Odd operand pairs are summed by the right adder 120, and even operand pairs are summed by the left adder 110.

In a standard PCEHB reshuffling, the interleave stage has to wait for the acknowledge signal from ripple-stage before it can enter neutral stage and accept new tokens. However, this would cause the pipeline to stall in case of a longer carry chain. Hence, PCEHB reshuffling is not used in the adder topology of these teachings. Instead of waiting for the output acknowledge signals from the right ripple-carry adder, the interleave stage 130 checks to see if the left ripple-carry adder is available. If it is, the interleave stage 130 asks for new tokens from the previous pipeline stage and forwards the arriving tokens to the left adder. The two ripple-carry adders could be in operation at the same time on different input operands. Since, in one exemplary instance, not a limitation of the teachings, the pipeline cycle time is approximately 18 logic transitions (gate delays), the next data tokens for the right adder are scheduled to arrive after 36 transitions of the first one. This gives ample time for even very long carry-chains to ripple through without causing any throughput stalls.

Table I shows the throughput results of one exemplary instance of the interleaved asynchronous adder of these teachings using SPICE simulations with different input sets. Compared to the 56-bit Hybrid Kogge-Stone CarrySelect Adder which gave a throughput of 2.17 GHz and energy/operation of 13.6 pJ when simulated by itself, the interleaved adder operates at an average throughput of 2.2 GHz for input cases with carry-length of fourteen or less while consuming only 2.9 pJ per operation. Not only it reduces the energy/operation by more than 4×, it also reduces the number of transistors in the 56-bit adder by 35%.

TABLE I

THROUGHPUT ACROSS DIFFERENT CARRY LENGTHS

| Input | 0-3 | 4-7 | 8-14 | 15- | 27 | Frequency |
|---|---|---|---|---|---|---|
| Deal | 88% | 9% | 2.7% | 0.3 | 0% | 2.2 GHz |
| I | 0% | 100% | 0% | 0% | 0% | 2.2 GHz |
| II | 0% | 0% | 100% | 0% | 0% | 2.2 GHz |
| III | 0% | 0% | 0% | 100 | 0% | 1.38 GHz |
| N | 0% | 0% | 0% | 0% | 100 | 0.78 GHz |

Left or Right Pipeline

In the baseline embodiment of the asynchronous FPA of these teachings, in the post-addition data path, the right shift, exponent adjustment determination component 80 constitutes a right pipeline and the left shift/exponent adjustment determination/LOP correction component 70 constitutes a left pipeline, as shown in FIG. 1. The two pipelines handle disjoint cases that could occur during floating point addition. The Left normalize pipeline handles cases when destructive cancellation can occur during floating-point addition, requiring a large left shift for normalization. The destructive cancellation scenario happens only when the exponent difference is less than a predetermined quantity, in one instance, two, and the FPA is subtracting the two operands. The Right pipeline handles all other cases.

Instead of activating both pipelines and selecting the result, the selection condition is computed early (prior to activating the LOP/LOD stage) and then only conditionally activate the appropriate path through the floating-point adder. The selection condition computation constitutes a pipeline selection component and it can be included in the front end 30 or the right alignment shifter 40. The LOP/LOD function blocks 60 determine the shift value for the left normalization shifter. The shift amount determined by LOP/LOD is only needed in cases which could potentially result in destructive cancellation. Hence, in the case of Right pipeline utilization, the energy associated with the LOP/LOD stage 60 can also be saved, because the results of the LOP/LCD are only used by the Left normalize pipeline. Compared to the baseline embodiment of the FPA, power savings of 13% for operands using the Left pipeline and power savings of up to 19% (12% Left pipe & 7% LOP/LOD) for operands using the Right pipeline which is the more frequent case.

In other embodiments of the FPA of these teachings, the energy efficiency is improved by considering other aspects of the FPA pipeline.

Two-Way Right-Align Shift

The Right-Align Shift block 40 is the second-most power consuming structure in the baseline FPA. It includes the right shifter logic as well as the logic to compute the guard, round, and sticky bits used for rounding. The sticky bit is set to one if any of the shifted out bits from the alignment shift stage is one; otherwise it is set to zero. In the worst case, the sticky bit logic has to examine all shifted bits, in one exemplary instance 53. To do this fast and in parallel with the right-align shifter, considerable extra circuitry is needed which consumes more power. For high throughput, the other (non-shifted) significand is slack-matched to the right-align shift logic using a number of WCHB pipeline stages. The Right-Align Shift block also compares the two significands to determine which of the two significands should be inverted in case of subtraction. The exponent difference and sign bit is used to generate enable control for the LOP. Each control bit is shared for two (one for each operand) radix4 significand entries. Overall, this comparison of significands and generation of large number of control bits is not cheap in terms of power consumption.

In one exemplary embodiment, these teachings not being limited to only the exemplary embodiment, the shifter comprises of three pipeline stages. The first stage shifts the significand between 0 to 3 bit positions based on the shift-control input. The second pipeline shifts by 0, 4, 8, or 12 bit positions and the third stage shifts by 0, 16, 32, or 48 bit positions using the shift-control input signals for the respective stages. Each radix-4 significand entry shift pipeline resembles a PCEHB template with a 4-to-1 multiplexor as the pull-down logic. Each stage produces multiple output copies to feed into 4 different PCEHB multiplexor blocks of the following pipeline stage. All this circuitry makes the shifter a costly structure in our FPA data path.

Figure 6:
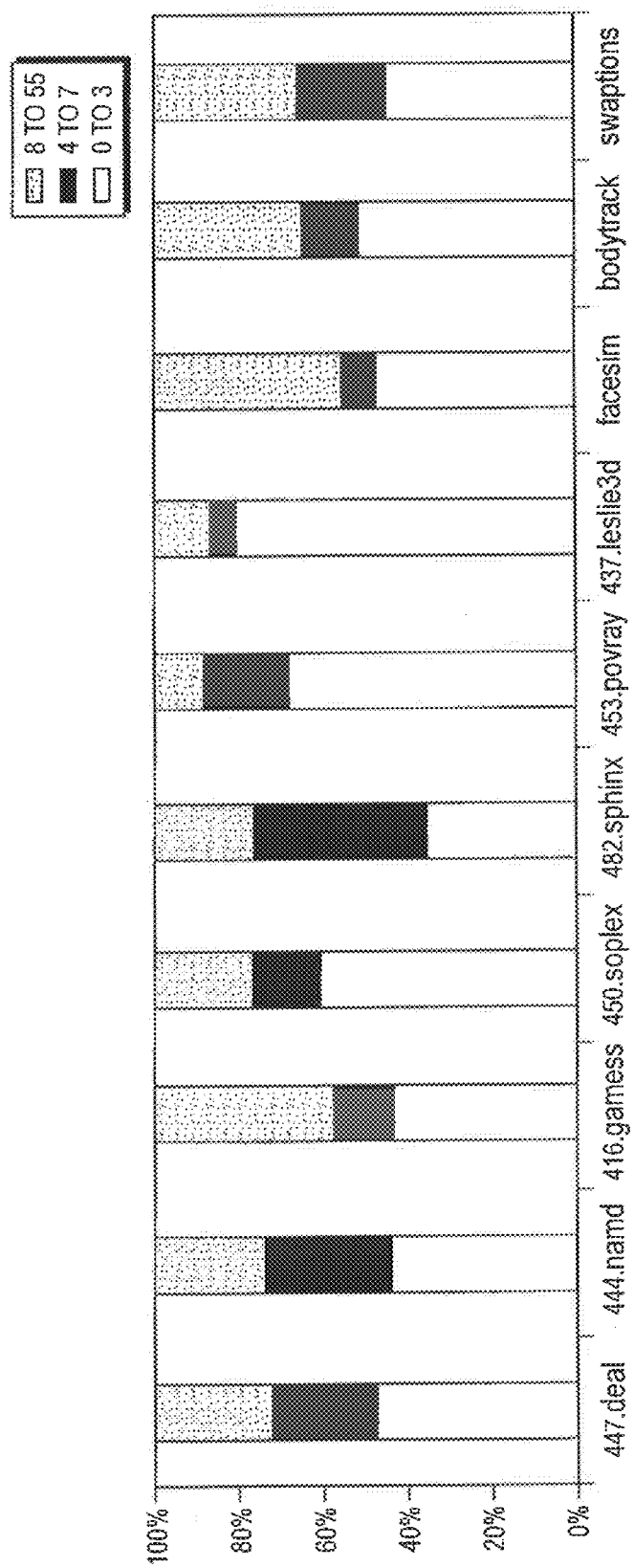
FIG. 6 is a graphical schematic representation of results for Right Align Shifter Statistics in a number of applications.

The key advantage of the shifter topology is its fixed latency for any shift value ranging, in the exemplary embodiment of the double precision addition, between 0 and 55 (the maximum align shift in a double-precision addition/subtraction). This advantage is also one of its drawbacks as it consumes the same power to do a shift by zero and a shift by a large value. FIG. 6 shows the right align shift patterns across 10 different benchmarks using operands gathered through PIN application profiling. Although these benchmark applications are from totally unrelated disciplines, they exhibit a common property: a significant proportion of right align shift values range between 0 to 3 inclusive. For one benchmark, the proportion of right align shifts of 0 to 3 is almost 81%. Although the above results are for one exemplary embodiment, for a more general embodiment, the first group of right align shifts would constitute the largest number of right align shifts.

In our baseline right-align shift topology, shifts by 0 to 3 are done in the first pipeline stage. However, in spite of that the significand still needlessly goes through the other two shift stages and in doing so wastes considerable power. It would have been an acceptable trade-off if most operations required align shifts by a large value, but the shift patterns shown in FIG. 6 show that the baseline FPA align shifter topology is highly non-optimum from an energy perspective.

Figure 7:
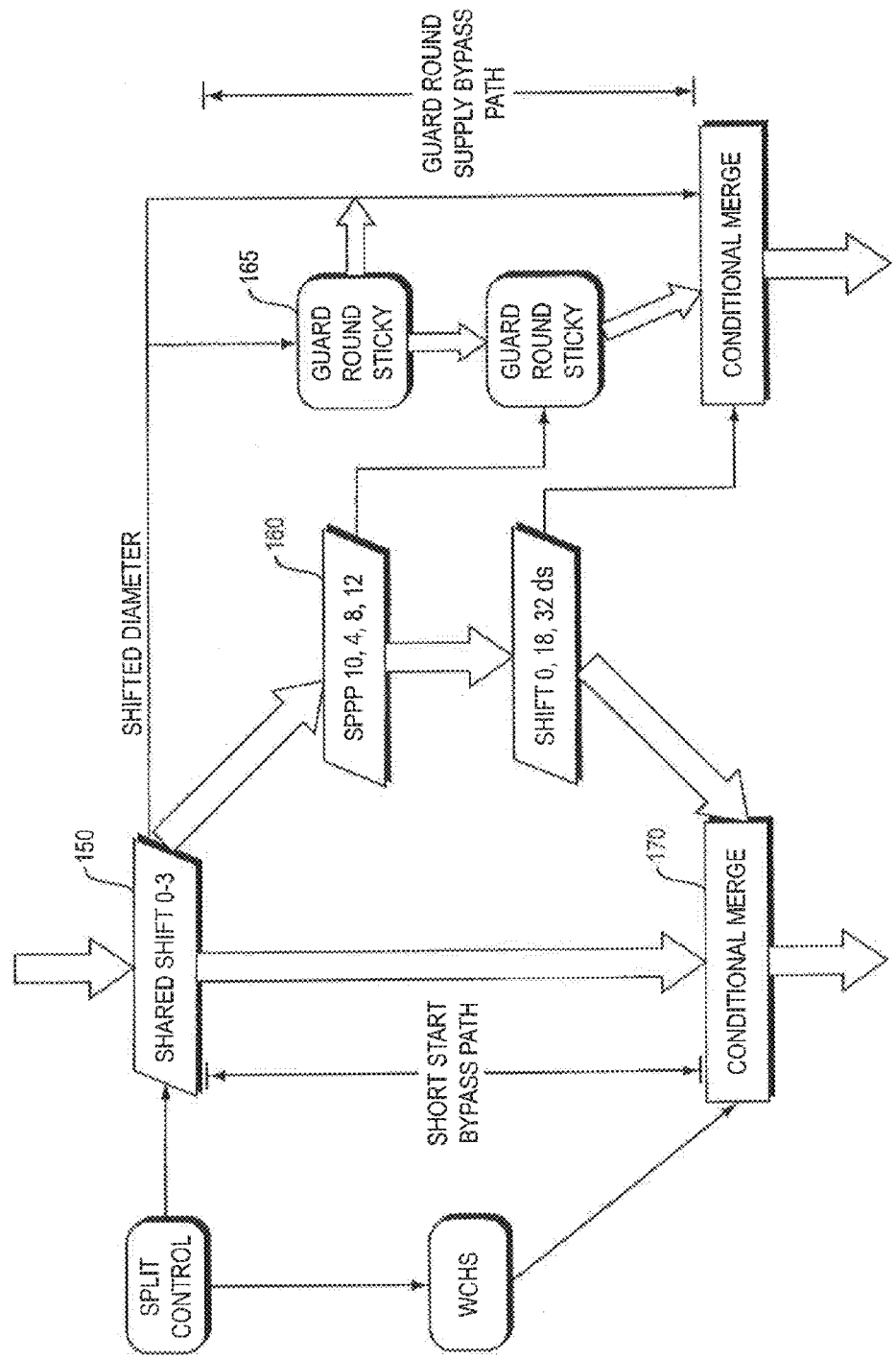
FIG. 7 is a schematic block diagram representation of one embodiment of the Two-Path Right-Align Shift component of the floating-point adder of these teachings.

In one embodiment, shown in FIG. 7, to improve the energy-efficiency of the align shifter, the align shifter component is split into two paths. The first stage 150 dealing with a right shift of 0 to predetermined bit position, 3 in the embodiment shown therein, is shared between two paths. In case of a shift greater than the predetermined bit position, 3 bit positions the embodiment shown therein, the significand is forwarded to the second shift pipeline stage 160 as in the original topology. However, for shifts of 0 to the predetermined bit position, 3 bit positions the embodiment shown therein, the significand output is bypassed to the post align-shifter pipeline stage, as shown in FIG. 7. The post align-shift stage includes a merge pipeline 170 which receives inputs from both the regular shift path and the short bypass shift path. The merge pipeline 170 selects the correct input using the buffered control signal which was earlier used to direct the significand to one of the two paths. The short shift path has multiple features which lead to significant power savings:

The shifted significand skips the remaining two shift pipelines

In contrast to the baseline topology which produces multiple significand outputs to be consumed in the following shift stages, the bypass shift path needs only one output for each significand.

The guard, round, and sticky computation becomes quite simple and requires minimal energy as only a maximum of 3 bits are shifted out.

The other (non-shifted) significand also bypasses the WCHB slack-matching buffers.

No shift select signals need to be generated and copied for the second and third shift pipeline stages.

Minimizing LOP Logic

For subtraction, the bits of the shifted significand are inverted except when the exponent difference is zero which then requires input from the significand comparison block to determine which one of the two significands is smaller. Since the case of exponent difference of zero corresponds to the bypass shift path, the significand comparison logic of the baseline FPA requiring multiple pipeline stages cannot be done in parallel with the bypass path without incurring a throughput penalty. The significand comparison constitutes a pre-LOP component determining a first operand for LOP operation. In one embodiment of the optimized FPA data path of these teachings, the significand comparison is moved to earlier pipeline stages.

With the result of significand comparison available early, the LOP logic stack can be simplified. In the LOP/LOD 60 of the baseline FPA, the logic to predict leading one when the sign digit difference of two operands is positive is different from the case when the sign-digit difference of two operands is negative. In one embodiment leading to a substantially optimized FPA, using the significand comparison result early in the FPA enables the LOP computation to assume that its first operand always corresponds to the larger significand. This information enables a reduction of the circuitry required for LOP computation.

In the baseline FPA embodiment, there is a separate pipeline stage to conditionally invert bits in case of subtraction. The baseline FPA generates control signals for each radix-4 position specifying which of the two significands if any need to be inverted. Since the LOP control bits in the substantially optimized FPA embodiment already contain information about the larger significand, in one embodiment, the conditional invert stage is merged with pre-LOP selection pipeline which determines the larger of the two significands as LOP's first operand. In that embodiment, the conditional invert component is included in the pre-LOP component. This eliminates the need of separate control signals for inverting bits and including savings from cutting a full pipeline stage leads to energy reduction of over 3%.

Post-Add Right Pipeline

The Right Pipeline block is the third most power-consuming structure in the baseline FPA. It includes a single-position right or left shifter, a 53-bit significand incrementer, rounding logic, and final exponent computation block for operands utilizing the Right Pipeline. As shown earlier in FIG. 6, on average more than 80% of the FPA operations use this block. Hence, power-optimization techniques for the circuits in this block have a notable impact on average FPA power savings.

The baseline carry-select incrementer comprises of four-bit blocks with each computing the output for the carry input of one into that block. In parallel, there is a fast carry-logic which computes the correct carry-input for each four-bit block. Lastly, there is a mux pipeline stage which selects either the incremented output or the buffered non-incremented bits for each four-bit block using the carry select input. In case of a carry-out of one, the significand is right shifted by one bit position.

Figure 8:
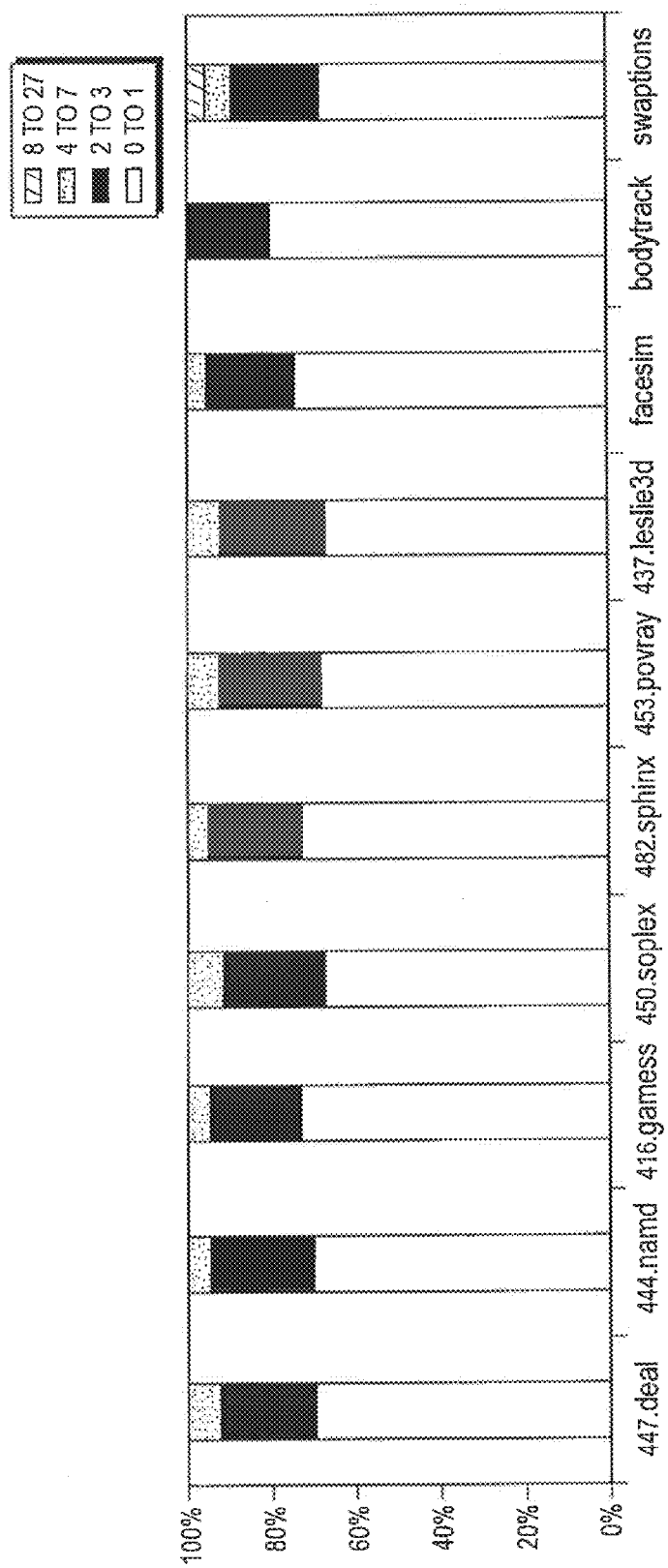
FIG. 8 is a graphical schematic representation of results for the Radix-4 Incrementer Carry Length in a number of applications.

One advantage of the baseline incrementer FPGA topology of these teachings is its fixed latency for the best (no carry propagation) and worst-case (carry propagates through all the bits) alike. However, as seen in FIG. 8, for over 90% of the operations using the increment logic, the carry propagation length is less than four radix-4 bit positions. Also, the case of a final carry-out occurs no more than 0.5% of the time.

The carry-select incrementer targeted for worst-case scenarios is a non-optimum choice for the average-case incrementer carry-length patterns. To improve energy-efficiency, in one embodiment, an interleaved incrementer, similar to earlier described interleaved adder, is used. Instead of using two ripple-carry adders, the interleaved incrementer of these teachings uses much simpler two radix-4 ripple-carry incrementers. The odd data token is forwarded to the right incrementer. For the next arriving data token, the interleave stage checks to see if the left incrementer is available. If it is, the interleave stage forwards the arriving tokens to it. The interleave merge stage receives the inputs from both incrementers and forwards those to the next pipeline stage in the same interleaved order in which they were scheduled. This allows the two incrementers to be in operation at the same time on different input operands.

The incrementer is used to adjust the result due to rounding. The interleaved incrementer topology of these teachings computes either the correct incremented or non-incremented output (not both) using the round-up bit as the carry-in, hence alleviating the need to have a separate mux stage to choose between two possible outputs. Simulation results for the new topology show no throughput penalty for average-case inputs. Also, there is no need for a separate post-increment right shift pipeline stage. The case where the final result must be right shifted by one only occurs when all significand bits are one, and the result must be rounded up. In that scenario, the incrementer output is all zero and hence both shifted and unshifted versions of the incrementer result are identical. Hence, for correct output, only the most significant bit needs to be set to one.

In the baseline FPA, until the incrementer carry-out is computed the correct exponent value cannot be computed. Since the carry-out is not available until the fourth pipeline stage in the Right Pipeline block, to prevent latency penalty the exponent values of exponent+C are always computed for C=0, fl, +2, with a mux stage choosing the correct output. To circumvent the problem of latency penalty, the exponent computation block is replaced with an interleaved incrementer/decrementer that mitigates any latency degradation with its average-case behavior. It uses a two bit carry in (first bit is set to 1 for increment, second bit is 1 for decrement, and both bits are 0 for a simple pass through) to compute exponent. Using dual-carry chain, exponent+1 is also computed simultaneously to be selected in case of a carry out. Overall, this computation of two exponent values is more energy-efficient than the baseline.

Figure 4A:
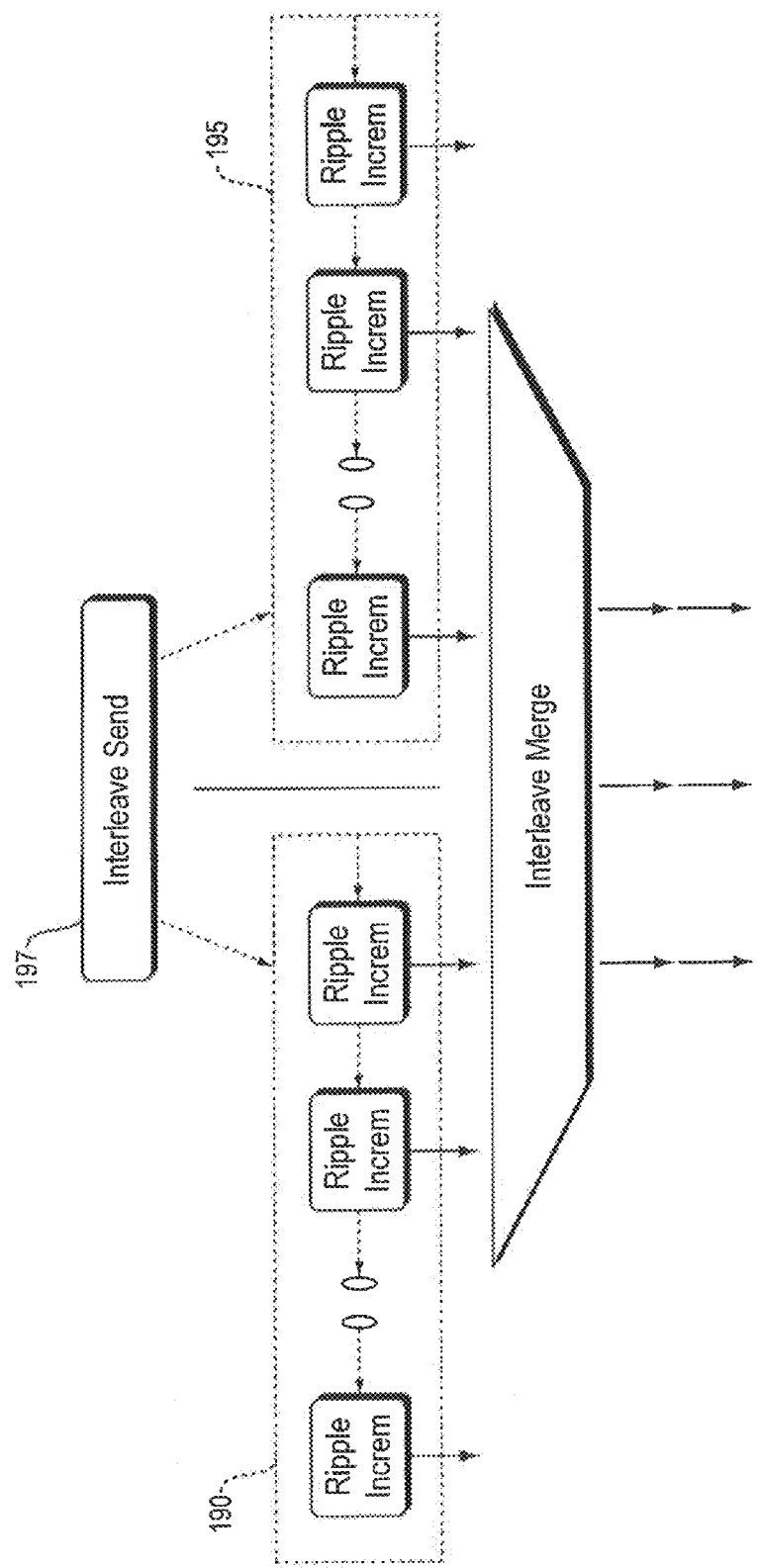
FIG. 4a is a schematic block diagram representation of one embodiment of the incrementer component of the floating-point adder of these teachings.
Figure 5:
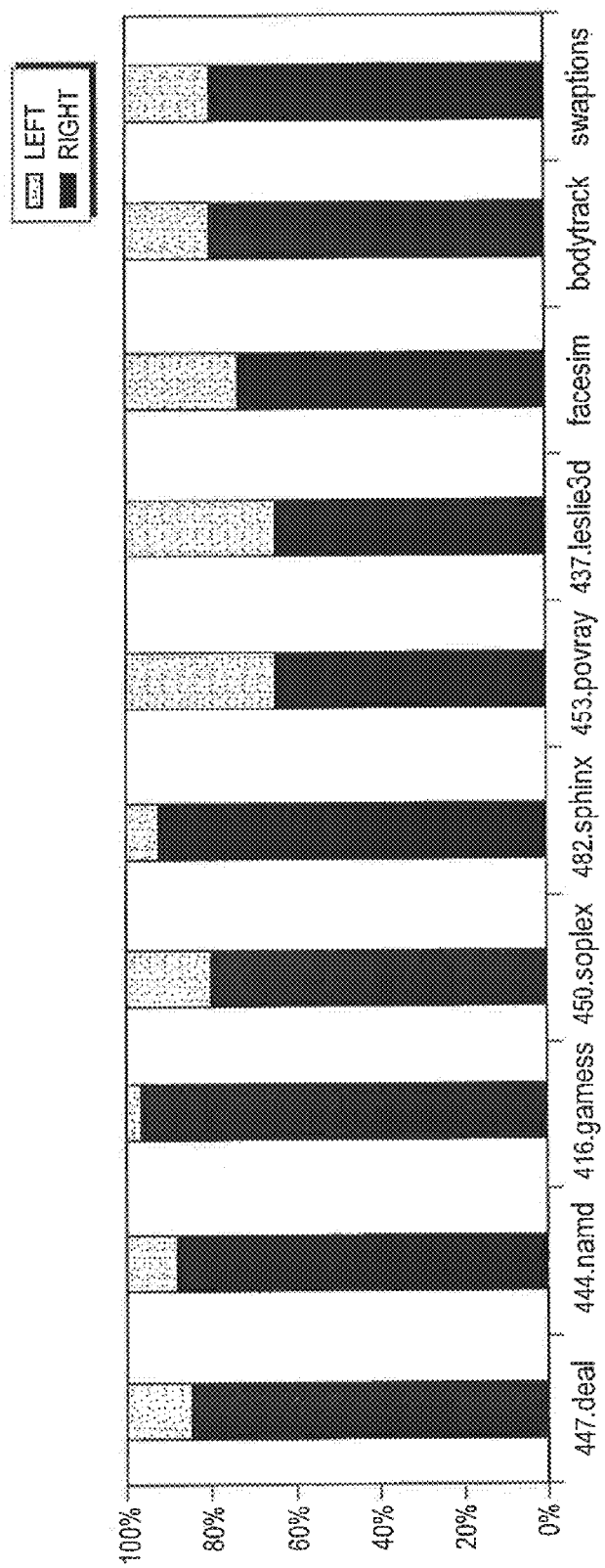
FIG. 5 is a graphical schematic representation of results for Left/Right Pipeline Frequency in a number of applications.

FIG. 4a shows one embodiment of the interleaved incrementer/decrementer of these teachings. Referring to FIG. 4a, the embodiment shown therein includes two ripple carry incrementers 190, 195, a right ripple carry incrementer 195 receiving odd numbered data tokens from the Interleave Send component 197, a left ripple carry incrementer 190 receiving a next arriving data token, if said left ripple carry incrementer is available, and an interleave merge component receiving an output of the right ripple carry incrementer 195 and an output of the left ripple carry incrementer 197.

Zero-Input Operands

Figure 9:
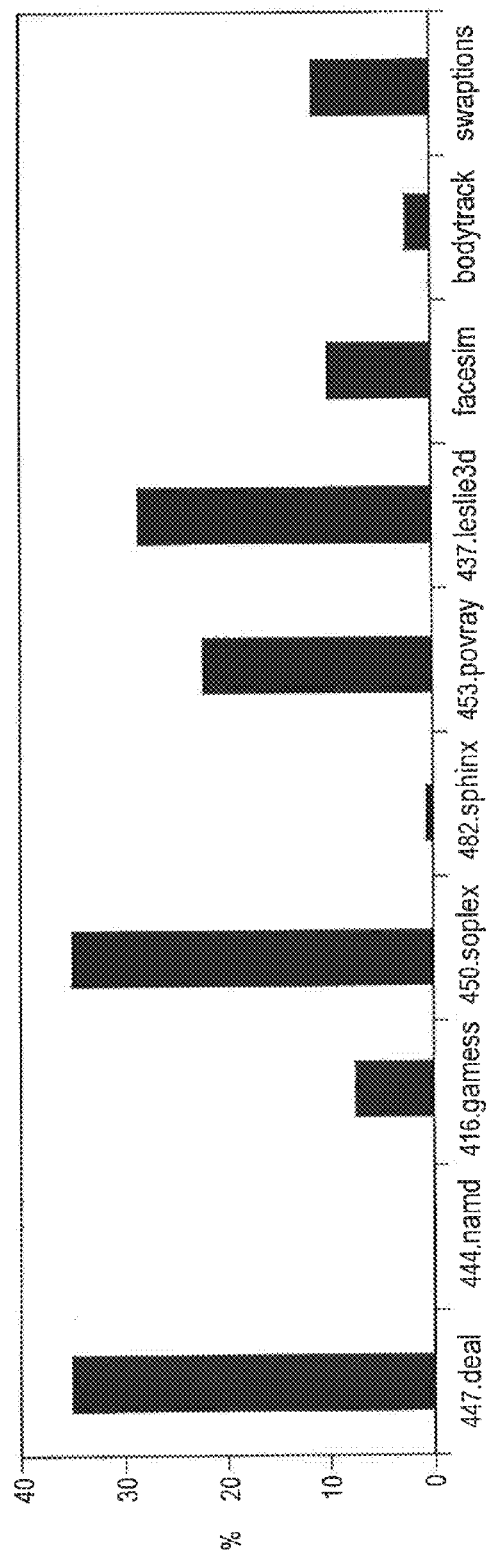
FIG. 9 is a graphical schematic representation of results for Zero-input Operands in a number of applications.

FIG. 9 shows that a few application benchmarks have a significant proportion of zero input operands. For the applications involving sparse-matrix manipulations such as Deal and Soplex, in spite of the use of specialized sparse-matrix computation libraries, the percentage of zero inputs can be as high as 36%. For other benchmarks, the zero-input percentage varies widely. In the baseline FPA of these teachings and almost all synchronous FPA designs, operations involving zero-input operands use the full FPA data path. Although, if one or both of the FPA operands are zero, the final FPA output could be computed without needing power-consuming computational blocks such as right-align shifter, significand adder, LOP/LOD, post-add normalization, and rounding.

Since the Unpack pipeline stage already checks to see if any operand is zero, the embodiment of these teachings resulting in an optimized FPA utilizes the zero flag to inhibit the flow of tokens into the regular data path. The zero flag is used as a control in the conditional split pipeline just prior to Swap stage to bypass the final sign, exponent, and significand bits to the last pipeline stage in case of a zero input. The last stage is replaced with a conditional merge pipeline which uses the buffered control signal to choose the input from either the zero bypass path or the regular FPA data path.

Figure 10:
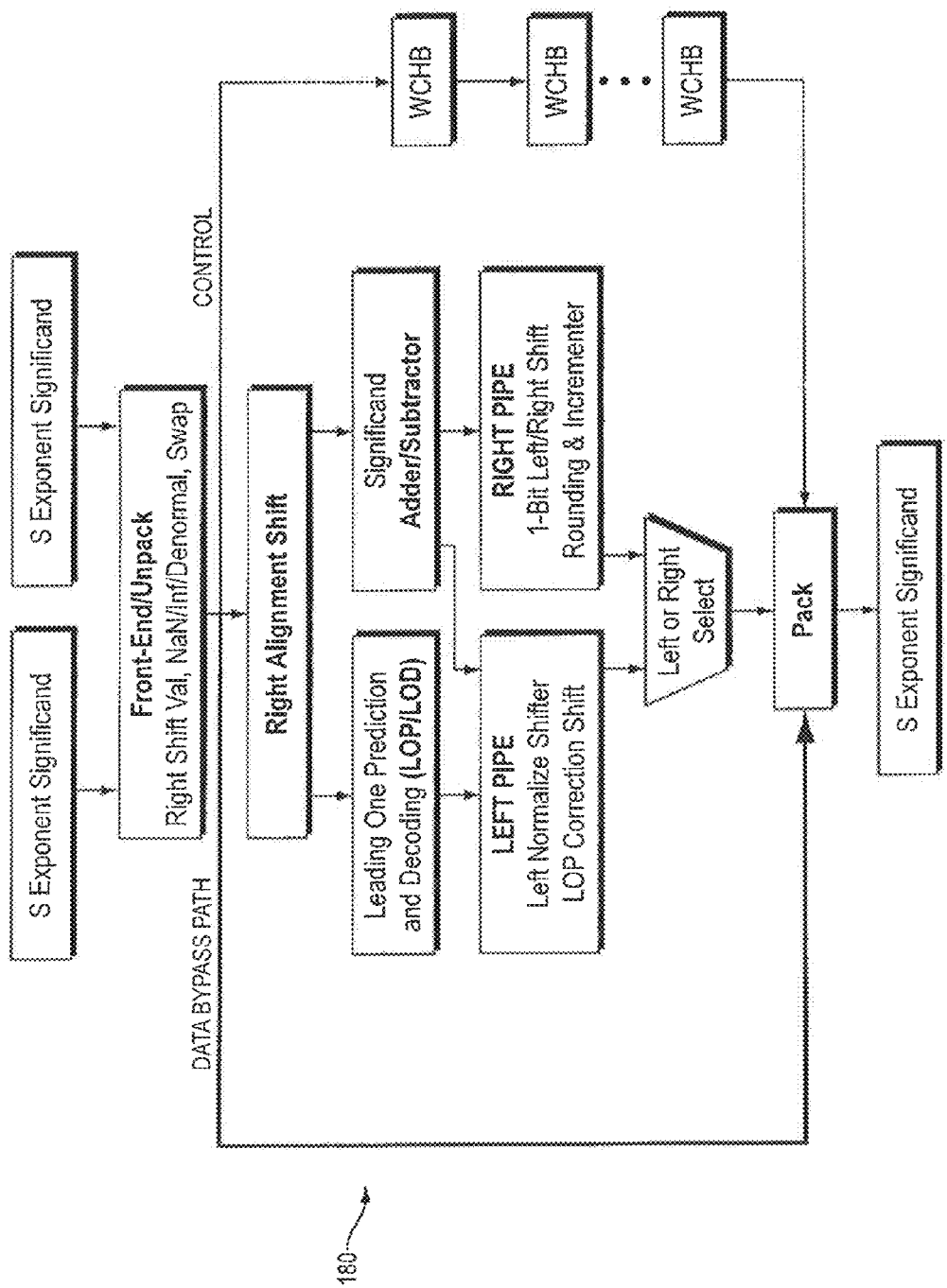
FIG. 10 is a schematic block diagram representation of another embodiment of the floating-point adder of these teachings.

An embodiment of the system of these teachings including the above described zero input bypass path is shown in FIG. 10. Referring to FIG. 10, the data bypass path 180 bypasses the alignment shift, component, the adder component, the leading one predictor (LOP)/decoder component, the left shift/exponent adjustment determination component, the right shift, exponent adjustment determination component and the left right-selection component when an input is zero.

In one embodiment, the method of these teachings for reducing power consumption/improving energy efficiency in an asynchronous floating-point full adder circuit includes replacing an adder component in the asynchronous floating-point full adder circuit with an interleaved asynchronous adder, the interleaved asynchronous adder having two Ripple-Carry adders, a left Ripple-Carry adder and a right Ripple-Carry adder, the two Ripple-Carry adders being asynchronous circuits.

In one instance, the embodiment of the method of these teachings for reducing power consumption/improving energy efficiency in an asynchronous floating-point full adder circuit also includes determining, where the asynchronous floating-point full adder circuit has a two-path, a right path and a left path, architecture and comprises a leading one predictor (LOP)/decoder component, prior to activating the leading one predictor (LOP)/decoder component, a path selection.

In another embodiment, the method of these teachings for improving energy efficiency of an asynchronous floating-point full adder circuit includes providing an alignment shift component having a first shift component for a shift between zero and a predetermined bit position, a second shift component receiving output of the first shift component for a shift greater than the predetermined bit position, a merge component receiving output of the second shift component for a shift greater than the predetermined bit position and output of the first shift component for a shift between zero and the predetermined bit position; an output of the first shift component being provided directly to the merge component if the shift is between zero and the predetermined bit position.

In one instance, the embodiment of the method of these teachings for improving energy efficiency of an asynchronous floating-point full adder circuit also includes simplifying a guard, round, sticky bit calculation due to shifting out as most a predetermined number of bits and bypassing the guard, round, sticky bit calculation when the guard, round, sticky bit calculation is not required.

In another instance, where the asynchronous floating-point full adder circuit includes a significand incrementer, the embodiment of the method of these teachings for improving energy efficiency of an asynchronous floating-point full adder circuit also includes utilizing an interleaved incrementer as the significand incrementer.

In yet another instance, where the asynchronous floating-point adder circuit includes a front end component, the front end component providing a determination of whether any input is equal to zero, the method for improving energy efficiency also includes bypassing, when an input is determined to be equal to zero, a number of the floating-point adder components.

The above described embodiments of the method of these teachings for improving energy efficiency are embodiments illustrating using operand characteristics for performance/energy optimization of a floating-point arithmetic unit where the floating-point arithmetic unit is an adder.

The above described techniques can all be incorporated, in various combinations, in the method of these teachings.

Figure 11:
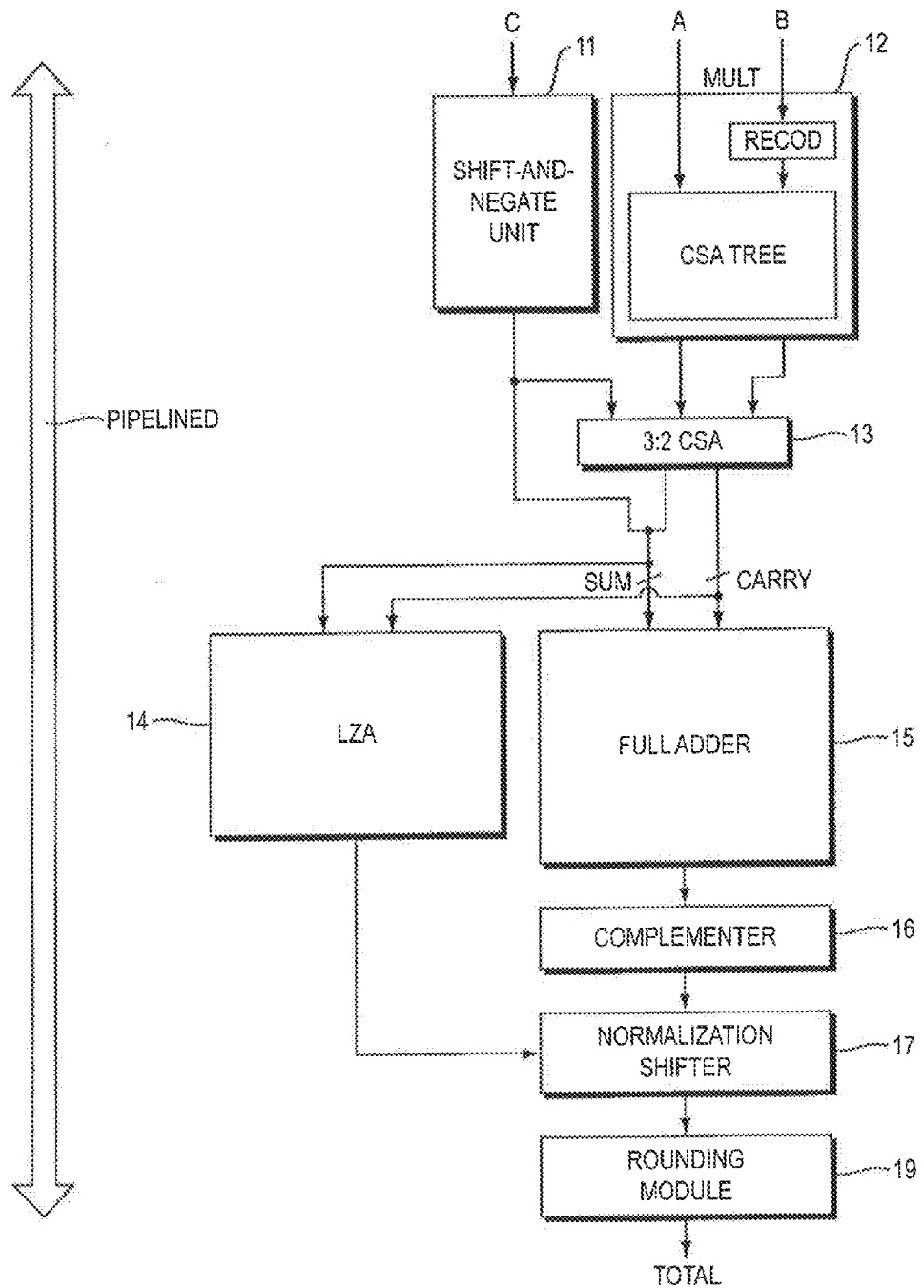
FIG. 11 is a schematic block diagram representation of an embodiment of fused multiply-adder (FMA) of these teachings.

FIG. 11 shows a block diagram of an embodiment of a fused multiply-adder of these teachings. Referring to FIG. 11, the embodiment shown therein is a fused multiply-adder 10 that includes a shift-and-negate (alignment shifter) module 11, a multiplication module 12, a 3-to-2 carry-save adder (CSA) 13, a leading zero anticipator (LZA) 14, a adder 15, a complementer 16, a normalization shifter 17, and a rounding module 18, each module utilizing quasi-delay insensitive (QDI) asynchronous circuits; the entire fused multiply-adder being asynchronously pipelined; asynchronously pipelining enabling optimization of the fused multiply-adder. (Synchronous fused multiply-adders are discussed, for example, in US Patent Application Publication 20080256161, which is incorporated by reference herein in its entirety for all purposes.)

The techniques used in the energy-efficient FPA design as disclosed hereinabove can also be applied to the Fused Multiply-Add (FMA) data path, which may lead to even more profound energy savings.

The three most power-hungry components in the FMA design are as follows:
1. Alignment Shifter of 0 to 161 bit positions
2. Multiplier Array which takes two 53 bit inputs
3. 106-bit Adder for summing the product with the third operand Alignment Shifter For alignment shift, most state-of-the-art FMAs use logarithmic shifters which are non-optimal for average-case shift patterns. By using a dual-path shifter topology, similar to that disclosed hereinabove, any unnecessary shift pipeline stages can be skipped for common shift patterns. The dual-shift topology of these teachings, disclosed hereinabove, yielded significant power savings in the embodiment of the optimized FPA of these teachings by avoiding full 55-bit position shift computational pipelines for each operation; savings are also obtain in the embodiment of the FMA of these teachings by skipping full 161-bit position shift pipelines.

In one embodiment, the Alignment Shifter in the fused multiply-adder of these teachings includes, as shown in FIG. 7, a first shift component for a shift between zero and a predetermined bit position, a second shift component receiving output of the first shift component for a shift greater than the predetermined bit position, and a merge component receiving output of the second shift component for a shift greater than the predetermined bit position and output of the first shift component for the shift between zero and the predetermined bit position.

Multiplier Array

The conditional pipelining techniques used to skip unnecessary stages in the FPA design can be used in the FMA multiplier array design. Most state-of-the-art multiplier array implementations use booth-encoded implementations. Instead of following a standard procedure of decoding each booth-encoded term separately, the multiplier design of this embodiment of these teachings looks at, in one instance, 5 consecutive bits (bits needed for two adjacent radix-4 booth-encoded controls) and generates a control signal which also includes a skip option in case one of the Partial Products is a zero. By combining the skip control of these teachings with conditional pipeline token send/merge feature, zero partial-product pipeline stages can be skipped with little overhead and without compromising throughput. This could, on average, lead to more than 20% power savings in the multiplier array design.

In one embodiment, the fused multiply-adder of these teachings includes a component, similar to that shown in FIG. 10, generating a control signal from a predetermined number of consecutive bits, where, when a value of a partial product is equal to zero, the control signal enables bypassing at least some pipeline stages.

106-Bit Adder

For the 106-bit Adder, the interleaved adder topology (used in one embodiment of the FPA of these teachings) is an energy-efficient choice as carry-propagation analysis yields similar patterns as those seen for the FPA.

In one embodiment, the adder in the fused multiply-adder of these teachings includes, as shown in FIG. 4, an interleaved asynchronous adder, the interleaved asynchronous adder includes two Ripple-Carry adders, a left Ripple-Carry adder and a right Ripple-Carry adder, the two Ripple-Carry adders being asynchronous circuits.

The Zero-operand optimization used in the FPA of these teachings becomes even more effective in the FMA data path. For non-fused instructions i.e. simple multiplication or add, one of the three operands is set to zero. Hence, the zero-path bypass is not used only for operands with actual zero input but also in all cases of non-fused instructions.

In one embodiment, the fused multiply-adder of these teachings also includes a front end component, as shown in FIG. 10, determining whether any input is equal to zero, where, if an input is determined to be equal to zero, the alignment shifter, the multiplier array and the adder or the adder are bypassed.

In one embodiment, the method of these teachings for improving energy efficiency in an asynchronous fused multiplier-adder includes avoiding unnecessary alignment shift operations. In one instance, the step of avoiding unnecessary alignment shift operations includes providing an alignment shifter, the alignment shifter having a first shift component for a shift between zero and a predetermined bit position, a second shift component receiving output of the first right shift component for a shift greater than the predetermined bit position and a merge component receiving output of the second shift component for a shift greater than the predetermined bit position and output of the first shift component for a shift between zero and the predetermined bit position.

In one instance, the method of these teachings for improving energy efficiency in an asynchronous fused multiplier-adder also includes generating a control signal from a predetermined number of consecutive bits, the control signal indicating when a value of a partial product is equal to zero and bypassing at least some pipeline stages, when the value of the partial product is equal to zero.

In yet another instance, the method of these teachings for improving energy efficiency in an asynchronous fused multiplier-adder also includes replacing an adder component in the asynchronous fused multiplier-adder circuit with an interleaved asynchronous adder, the interleaved asynchronous adder comprising two Ripple-Carry adders, a left Ripple-Carry adder and a right Ripple-Carry adder; said two Ripple-Carry adders being asynchronous circuits.

In a further instance, the method of these teachings for improving energy efficiency in an asynchronous fused multiplier-adder also includes determining whether any input is equal to zero, and bypassing the multiplier array and the adder or the adder, if an input is determined to be equal to zero.

It should be noted that the techniques disclosed hereinabove for improving energy efficiency in an asynchronous fused multiplier-adder can be practiced in various combinations or alone.

In one or more embodiments, the floating-point multiplier of these teachings includes an unpacking component (210, FIG. 12), the unpacking component unpacking a representation of multiplicands into sign, exponent and mantissa, an array multiplier component (220, FIG. 12) receiving mantissa bits for each input, the array multiplier generating partial products, providing the partial products to a number of carry-save adders and providing two bit streams as output, a carry propagation adder component (230, FIG. 12) receiving most significant bits of each of the two bit streams, a carry, round and sticky bit component (240, FIG. 12) receiving least significant bits of each of the two bit streams and a round and normalization component (250, FIG. 12) receiving output from the carry propagation adder and the carry, round and sticky bit component, a carry, round and sticky bit component receiving least significant bits of each of the two bit streams, and a round and normalization component receiving output from the carry propagation adder and the carry, round and sticky bit component, the array multiplier being asynchronously pipelined.

Figure 12:
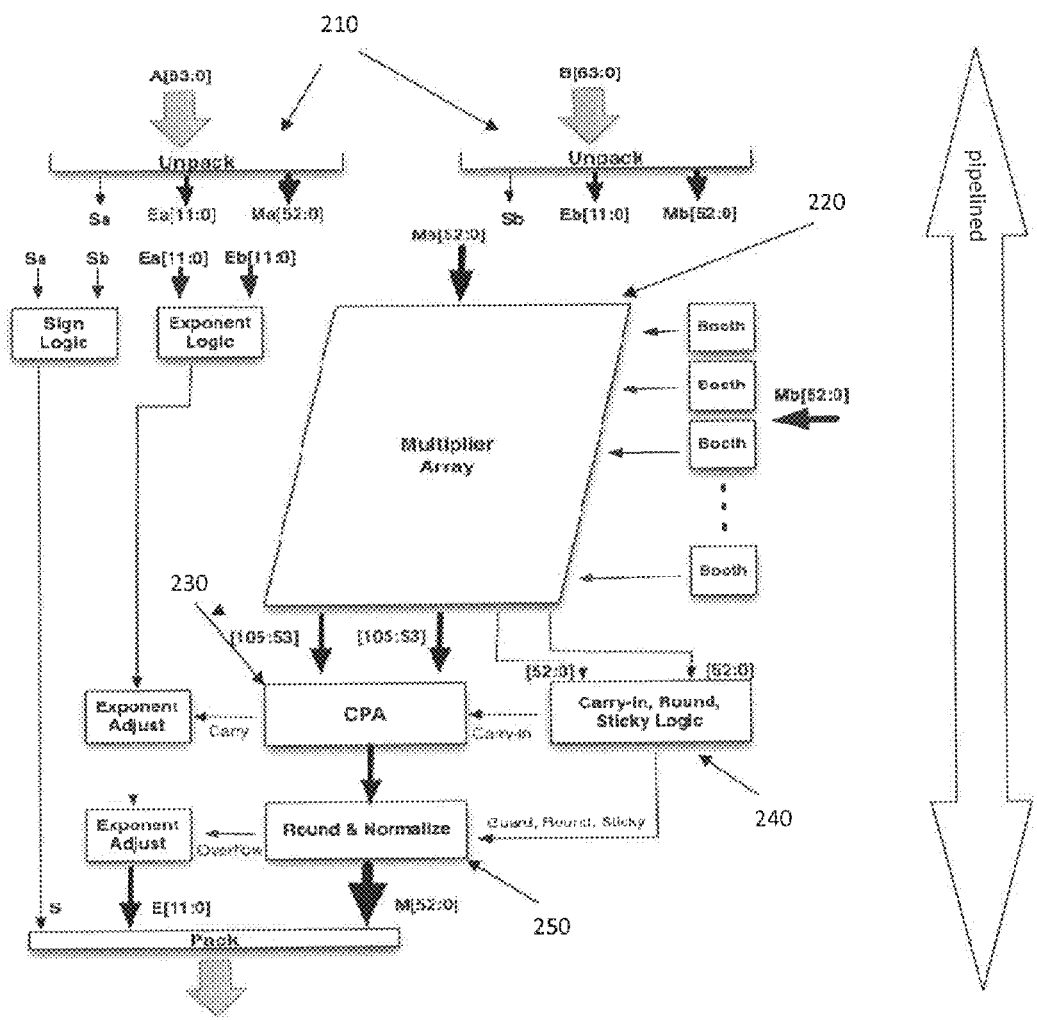
FIG. 12 is a schematic block diagram representation of an embodiment of the floating-point multiplier of these teachings.

In terms of micro-architectural complexity, the floating-point multiplier (FPM) datapath is simpler than the FPA datapath. The FPM datapath for double precision multiplication operation as implemented in one exemplary embodiment of these teachings is shown in FIG. 12. The double-precision inputs into the datapath, A and B, comprise 1-bit of sign, 11-bits of exponent, and 52-bits of mantissa (also known as the significand) each.

The following summarizes the key steps in an IEEE compliant FPM datapath:

The first step in the FPM datapath is to unpack the IEEE representation and analyze the sign, exponent, and mantissa bits of each input to determine if the inputs are standard normalized or are of one of the special types (NaN, infinity, denormal).

The mantissa bits are extended with the implicit bit. It is set to one for normal inputs and zero for a denormal input.

The 53-bit long mantissas of both inputs are used to generate partial products corresponding to 106-bit product. Since high throughput and low latency are of essence in floating-point applications, most FPMs use some form of an array multiplier, such as a booth-encoded multiplier as shown FIG. 12, to meet the performance demands. Most, array multipliers employ an array of carry-save-adders (CSAs) [27] to reduce the large number of partial products to two final full product-length bit streams.

The most significant 53-bits of the two output bit streams from the CSA array are summed up using a carry propagation adder (CPA) to generate a 53-bit mantissa. The least significant 53-bits are used to generate the carry input to the CPA as well as compute the guard, round, and sticky bits to be used in post normalization rounding.

In parallel, the exponent logic computes the resulting exponent, which is a sum of the exponent values of both inputs minus the bias. The bias has a value of 1023 in case of double-precision operations. The sign of final product is also computed.

The post multiplication step includes normalization of the 53-bit mantissa. For normal inputs and non-underflow cases, either the mantissa is already normalized or it may require a right shift by a single bit position, in which scenario the exponent is adjusted, in parallel, by adding one to it. The guard, round, and sticky bits are updated and are used, along with the round mode, to determine if the product needs to be rounded or not.

In case of rounding, the mantissa is incremented by one. If rounding yields a carry out, the exponent is adjusted by adding one to it and right shifting the mantissa by one bit position.

The final stage checks for a NaN, infinity, or a denormal outcome before outputting the correct result in the IEEE format.

With normalization step limited to a simple shift of no more than one-bit position and the exponent logic comprising only 11-bit long arithmetic, the FPM's complexity is largely a function of its 53×53 multiplier, sticky bit computation block, and the final carry propagation adder. Various structural and circuit-level optimization techniques to reduce the complexity and power consumption footprint of the aforesaid logic blocks are presented herein below.

Quasi-delay-insensitive (QDI) asynchronous circuits for are used in the baseline PM design. The fine-grain asynchronous pre-charge-enable-half-buffer (PCeHB) pipelines in our design contain only a small amount of logic (e.g. a two-bit full-adder). The actual computation is combined with data latching, which removes the overhead of explicit output registers. This pipeline style has been used in previous high-performance asynchronous designs.

Figure 13:
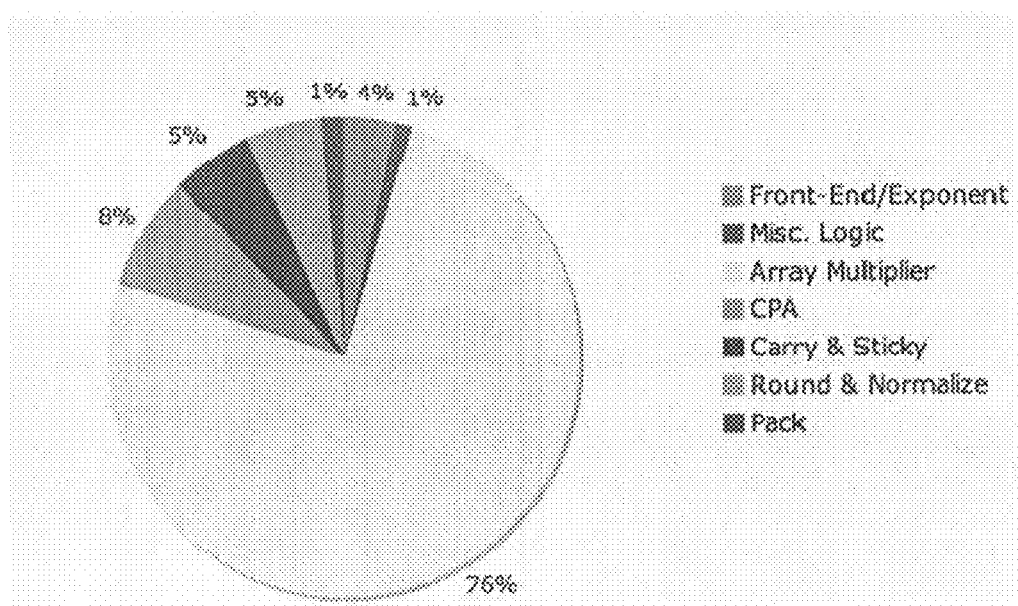
FIG. 13 is a graphical representation of power breakdown estimates in a pipeline asynchronous floating-point multiplier of these teachings.

Unlike in the FPA datapath where total power is distributed roughly evenly amongst a number of different logic blocks, the FPM's complexity is largely a function of its 53×53 multiplier. This is highlighted in FIG. 13 which shows the power breakdown estimates of the baseline fully QDI FPM datapath of these teachings. The booth-encoded array multiplier accounts for roughly 76% of the total power consumption. Hence, these teachings primarily focus on reducing energy/power of the array multiplier block.

The Front-End/Exponent block corresponds to the logic that unpacks IEEE format inputs and analyzes the sign, exponent, and mantissa bits of each input to determine if the inputs are standard normalized or are of one of the special types (NaN, infinity, denormal). It also includes the logic to compute the resultant exponent of the FPM product. The array multiplier outputs two 106-bit streams. The most significant 53-bits of the two output bit streams from the array multiplier are summed up using a carry propagation adder (CPA) to generate a 53-bit mantissa. The least significant 53-bits are used to generate the carry input to the CPA as well as compute the guard, round and sticky bits to be used in post normalization rounding. The sticky bit computation block and the final carry propagation adder are the other power consuming structures within the FPM datapath. Herein below various structural and circuit-level optimization techniques to reduce the complexity and power consumption footprint of the aforesaid logic blocks are presented.

The choice of a particular multiplier design depends on a number of factors. These include: desired throughput, overall latency, circuit complexity, and the allowed, power budget. Traditionally, high performance has been the key driving factor in multiplier design. However, as power consumption has become a major design constraint lately, a number of low-power multiplier designs have been proposed both in synchronous and asynchronous domains.

Iterative multipliers represent a low complexity design choice. An iterative multiplier utilizes a few functional units repeatedly to produce the result. Iterative multipliers can be used to reduce energy consumption by exploiting input data patterns; stages which add zero to the partial product could be detected in advance and skipped, hence reducing delay and energy consumption. Though compact in terms of area, iterative multipliers are not feasible to be used in floating-point multiplier hardware due to their very high latency and low throughput.

Reduction in the total number of partial products is the key goal of all multiplier optimization techniques, as it helps to reduce both latency as well as energy consumption. Along these lines, Efthymious et al. proposed an asynchronous multiplier implementation based on the original Booth algorithm (A. Efthymious, W. Suntiamorntut, J Garside, and L. E. M. Brackenbury, An asynchronous, iterative implementation of the original booth multiplication algorithm, Proceedings of the International Symposium on Asynchronous Circuits and Systems, 2004, which is incorporated herein in its entirety and for all purposes). Their design scans the multiplier operand and skips chains of consecutive ones or zeros. This can greatly reduce the number of partial product additions required to produce the product. The downside is that it requires a variable length shifter to correctly align multiplicands for generating each partial product row. The effectiveness of this algorithm for high performance FPM hardware is dependent on the number of variable length shifts, which in turn depends on the number of partial product rows that are to be generated.

Application profiling results for a number of scientific and emerging floating-point applications, using Intel's PIN toolkit, indicate that although the original Booth algorithm is able to reduce the number of partial products from the maximum of 27, a sufficiently large number of partial products rows, more than 18 on average, still need to be generated, each of which requires the use of variable shifter. The latency overhead of such a large number of variable shift operations is too costly for any high performance PPM design. Hence, the present teachings do not use the iterative multiplier.

Array multipliers are the common choice for high through-put and low latency multiplication operations in most commercial FPM designs. They produce a pre-determined fixed number of partial products, which greatly minimizes if not fully eliminates the opportunities for exploiting data dependent optimizations. For example, introducing logic to bypass a zero partial product instance may add the same amount of delay as summing the extra term in a carry save adder (CSA used to reduce the partial product terms. As array multipliers present very limited opportunities for data dependent optimizations, there has not been much work on asynchronous array multiplier solutions.

The simplest implementation of an n by n array multiplier produces n partial products in parallel, which are then summed up using CSAs. The large number of partial products makes this simple design unfeasible for both latency and power consumption perspective. As a result, many advanced synchronous multiplier implementations use some form of radix-4 modified booth algorithm, which cuts the number of partial products to n/2. The reduction in the number of partial products yields significant savings in energy consumption, latency, as well as the total transistor count.

For a 53×53-bit multiplier in an FPM datapath, with inputs Y and X, a radix-4 booth-encoded algorithm produces 27 partial products. Each of the Y and X inputs is in a radix-4 format. The multiplier bits, X, are used to generate booth control signals for each partial product row. One of the big-advantages of radix-4 booth multiplication is the relative simplicity of the logic which generates partial product rows. The only multiples of the multiplicand that are needed are: 0, ±Y, and ±2Y. Partial product term Y is generated by simply assigning it the multiplicand. The 2Y multiple can be generated with relative ease by assigning it one bit right shifted value of the multiplicand. Bitwise inversion is used to generate complemented multiples. To reduce these 27 partial product rows to two partial product rows, a reduction tree comprising 7 stages of 3:2 counters/carry-save-adder (CSAs), is usually employed.

The energy consumption of the multiplier array is directly correlated to the number of partial product terms. With more partial product terms, more logic is needed first to produce those terms and then to sum and reduce those terms using a reduction tree. To further improve energy efficiency, one of the alternatives is to use a radix-8 Booth-encoded multiplier which reduces the number of partial product rows from 27 down to 18. The biggest disadvantage of a radix-8 multiplier is that it requires a 3Y multiple which needs a full length carry propagation adder to compute Since the 3Y multiple must be available before any partial product term is computed, a tree adder topology such as a hybrid Kogge-Stone carry-select adder must be used to minimize any latency degradation in a synchronous design.

Table II compares three different radix length implementations of a 53×53-bit multiplication unit in terms of the total partial products bits and the number of logic stages required to reduce the total number of partial product rows to two rows. A radix-8 Booth-encoded implementation produces 62.4% and 31.3% less partial products bits compared to bitwise radix-2 and Booth-encoded radix-4 multipliers respectively. But in terms of latency, when compared to a radix-8 version, a radix-4 implementation needs only one extra logic stage because partial product terms are summed and reduced using CSAs in a tree structure, which has logarithmic logic depth. This gives a radix-8 multiplier a single logic stage cushion to compute the tough 3Y multiple. Hence, for any radix-8 Booth multiplier to be considered a viable alternative, it must provide a very low latency 3Y computation unit with energy consumption significantly lower than the savings attained with the use of 31.3% less partial product bits. The use of power intensive tree adders greatly diminishes the savings that result from the reduction in the number of partial product terms. As a result, radix-8 multipliers are not commonly used in synchronous FPM implementations.

TABLE II

ARRAY MULTIPLIER

| Multiplier Type | Partial Product Bits | Reduction Stages |
|---|---|---|
| Radix-2 Bitwise | 2809 | 9 |
| Radix-4 Booth | 1539 | 7 |
| Radix-8 Booth | 1056 | 6 |

Figure 14:
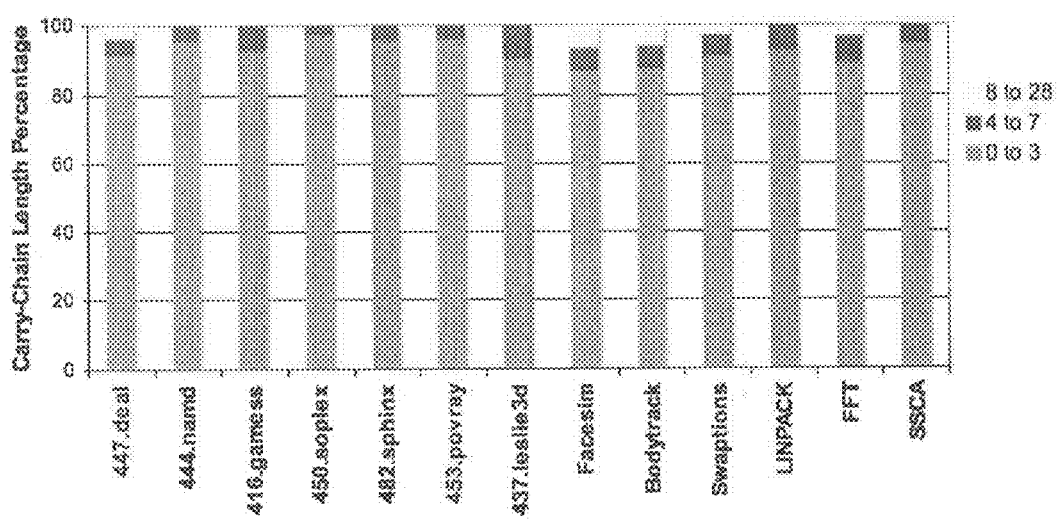
FIG. 14 is a graphical representation of the longest carry chain in a Radix-4 3Y adder.

The highly operand dependent nature of the 3Y multiple computation makes it a strong potential target for asynchronous circuit optimizations. The application profiling results in FIG. 14 show that the longest carry chain in a radix-4 3Y ripple-carry addition is limited to 3 ripple positions for over 90% of the operations across most floating-point application benchmarks. The delay of an adder depends on how fast the carry reaches each bit position. For input patterns that yield such small carry chain lengths on average, we need not resort to an expensive tree adder topology designed for the worst-case input pattern of carry propagating through all bits.

The interleaved adder topology provides an energy efficient solution for computing the bottleneck 3Y multiple term required in radix-8 Booth multiplication. It comprises two 53-bit radix-4 ripple-carry adders, where each 3Y block shown in FIG. 15 computes the 3Y multiple for the corresponding Y input. The first arriving data tokens YRs are forwarded to the right 3Y adder. In standard PCeHB reshuffling, the interleave split stage has to wait for the acknowledge signal from ripple-carry adder before it can enter neutral stage and accept new tokens. However, this would cause the pipeline to stall in case of a long carry chain. The interleaved adder topology circumvents this problem by instead issuing the next arriving data tokens to the left 3Y adder. Hence, the two ripple-carry adders could be in operation at the same time on different input operands. The interleave merge stage receives outputs from both right and left adders and forwards them to the next stage in the same interleaved order. With the pipeline cycle time of approximately 18 logic transitions (gate delays), the next data tokens for the right adder are scheduled to arrive after 36 transitions of the first one. This gives ample time to quite rare inputs with very long carry-chains to ripple through as well without causing any throughput stalls.

For inputs patterns observed in the various floating-point application benchmarks of these teachings, the forward latency of computing the 3Y term using the interleaved adder is less than that attained with power-intensive tree adders, which are frequently used in synchronous designs to guarantee low latency computation. Compared to a 53-bit hybrid Kogge-Stone carry-select tree adder implementation, the interleaved adder consumes approximately 68.1% less energy at 8.3% lower latency for the average case input patterns shown in FIG. 14. The data dependent adder design topology is exploited in these teachings, not possible within the synchronous domain, to the sign and energy-efficient Radix-8 Booth encoded multiplier for the asynchronous FPM datapath of these teachings.

Figure 15:
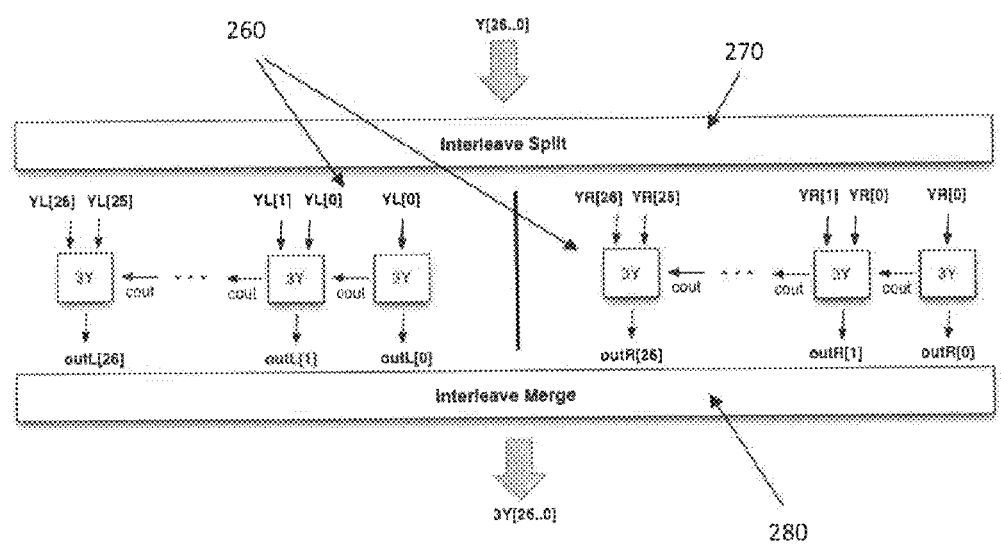
FIG. 15 is a schematic block diagram representation of an interleaved 3Y adder of these teachings.

In one embodiment, in the floating-point multiplier of these teachings, when the floating-point multiplier is at least a radix-4 multiplier, the 3Y partial product adder is an interleaved adder such as that shown in FIG. 15. Referring to FIG. 15, in the embodiment shown there in, the interleave adder includes two Radix-4 ripple adders 260, a left ripple adder and a right ripple adder, the two Radix-4 ripple adders being asynchronous circuits, a splitter pipeline 270 receiving an input from a Y partial product and a merge pipeline 280 receiving output from each one of the two Radix-4 ripple adders.

In one instance, a single track handshake protocol is used in each template in the asynchronous pipeline in the floating-point multiplier of these teachings. In order to elucidate these teachings, a discussion of asynchronous pipelines is presented herein below. (Further details of the pipeline template embodiments of these teachings are disclosed in International Application Publication No. WO 2013/020114, corresponding to International Patent Application No. PCT/US2012/049653, and in Basit Riaz Sheikh and Rajit Manohar, Energy-Efficient Pipeline Templates for High-Performance Asynchronous Circuits, ACM Journal on Emerging Technologies in Computing Systems, Vol. 7, No. 4, Article A, Pub. date: December 2011, both of which are incorporated by reference herein in their entirety and for all purposes.)

High performance asynchronous circuits are composed of many parallel processes. As opposed to synchronous circuits, which use a global clock to synchronize data tokens between different pipeline stages, these asynchronous parallel processes use handshake protocols to communicate with each other. These parallel processes are often referred to as fine-grain pipelined circuits. The fine-grain pipelined circuits use designated channels for communication between processes. A channel comprises a bundle of wires and a communication protocol to transmit data from a sender to a receiver. A robust family of these circuit templates is referred to as quasi-delay-insensitive (QDI) circuits.

Figure 16:
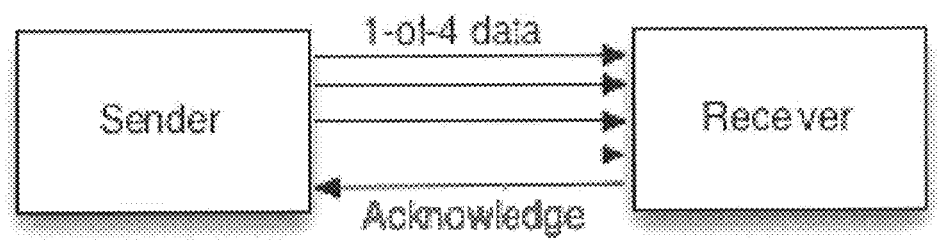
FIG. 16 is a schematic block diagram representation of a conventional sender-receiver handshake protocol.

QDI circuit templates use 1-of-N encoded channels to communicate between different parallel processes. In a 1-of-N channel, a total of N wires is used to encode data with only one wire asserted at a time. Most high throughput QDI circuits either use 1-of-2 (dual-rail) or 1-of-4 encodings. In an 1-of-4 encoded channel communication as shown in FIG. 16, validity is signified by setting one of the four data rails and neutrality is indicated by resetting of all four data rails. In a four phase handshake process, which is commonly used in most high speed QDI circuits, the sender process initiates the communication by sending data over the rails, i.e. by asserting one of: the data rails. The receiver process detects the presence of data and sends an acknowledge once it no longer needs the data. At this point, the sender process resets all its data rails. The receiver process detects the neutrality of input tokens. It de-asserts the acknowledge signal once it is ready to receive a new data token. The cycle repeats.

Figure 17:
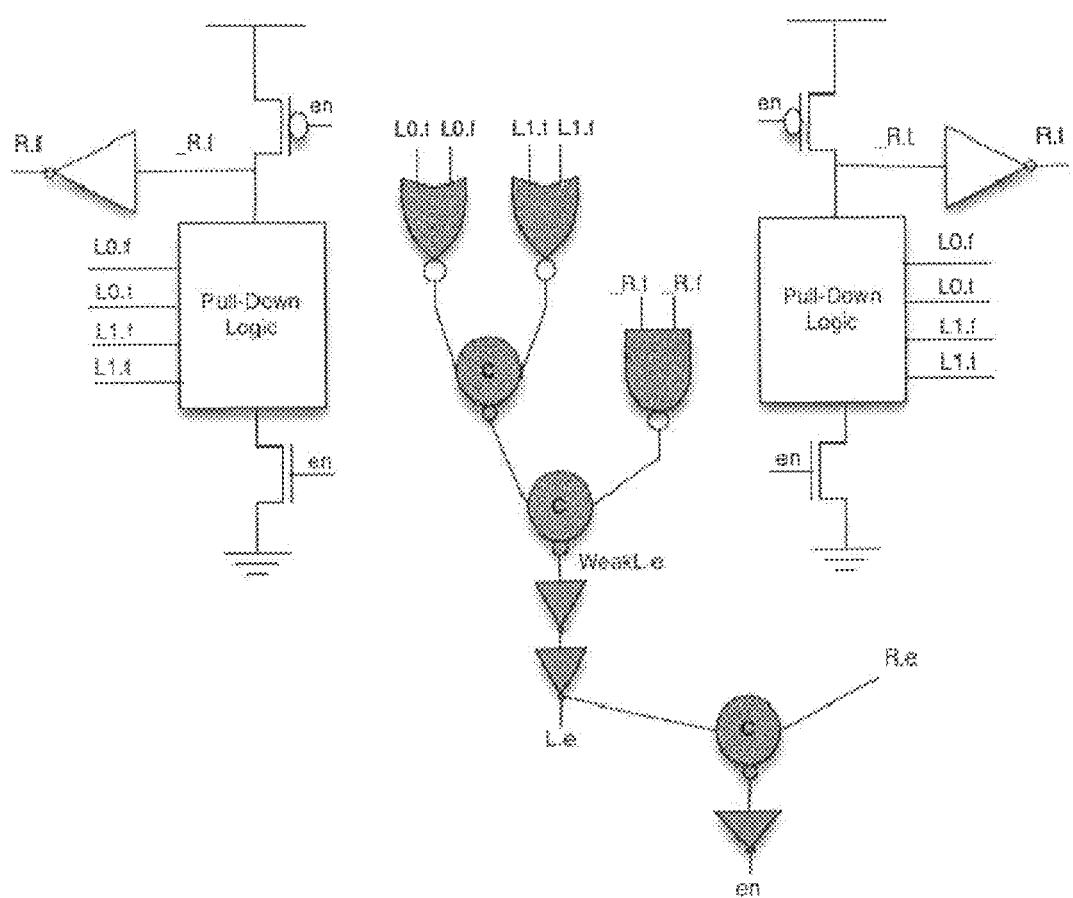
FIG. 17 is a schematic circuit diagram representation of a conventional PCeHB template.

The pre-charge enable half-buffer (PCeHB) template is a workhorse for most high throughput QDI circuits. It is both small and fast with a cycle time of 18 transitions. In a. PCeHB pipeline, the logic function being computed is implemented by a pull-down NMOS stack. The input and output validity and neutrality are checked using separate logic gates. The actual computation is combined with data latching, which removes the overhead of explicit registers. A PCeHB template can take multiple inputs and produce multiple outputs. FIG. 17 shows a simple two input and one output PCeHB template. L0 and L1 are dual-rail inputs to the template and R is a dual-rail output. A PCeHB template has a forward latency of two transitions. Each pipeline stage computes logic by using a NMOS pulldown stack followed by an inverter to drive the output.

The highlighted logic gates in FIG. 17 are not used for the actual computation but are only required for the handshake protocol. This includes the generation of completion detection signal (L.e) as well as the en signal that is used to enable computation or latching in the pipeline stage. As the number of inputs into a PCeHB pipeline stage increases, the input validity tree becomes more complex and may require extra stages to compute, which leads to an increase in the cycle time. The same holds true as the number of outputs increase. Hence, for high-throughput circuits each PCeHB stage contains only a small amount of logic with only a few inputs and outputs. This leads to significant handshake overhead, in terms of power consumption and transistor count, as tokens may have to be copied for use in separate processes with each process doing its own validity and neutrality checks.

Table III shows the power consumption breakdown of a simple full-adder circuit implemented using a PCeHB template. Only 31% of the total power is consumed in the actual logic, while the rest is spent in implementing the handshake protocol. This is a significant power overhead, which gets worse as the complexity of PCeHB templates increases with more inputs and outputs. To improve the energy efficiency of high throughput asynchronous pipelines, a look at alternative handshake protocols as well as some timing assumptions in QDI Circuits is provided below.

TABLE III

| PCeHB full-adder pipeline: power breakdown | |
|---|---|
| Circuit | Power |
| Logic | 31% |
| Handshake | 69% |

In a four phase handshake protocol, the pipeline stage needs to detect the validity and the neutrality of both inputs and outputs. During the second half of the four-phase protocol when the pipeline is waiting for inputs and outputs to be reset, no actual logic is being computed but it still consumes roughly half of the cycle time. Furthermore, the power consumed in detecting the neutrality of inputs and outputs rivals that consumed during their validity detection. Due to these characteristics, the four phase handshake protocol is clearly not an ideal choice for energy efficiency.

Figure 18:
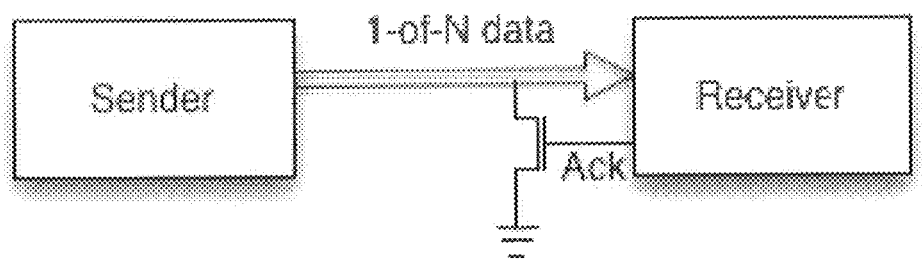
FIG. 18 is a schematic block diagram representation of a single track handshake protocol as used in these teachings.

Single-track handshake protocol tries to overcome this weakness of four phase protocol by practically eliminating the neutrality phase. FIG. 18 shows an overview of a single-track handshake protocol. The sender process initiates the communication by sending the data token. The receiver uses the data for computing its logic. Once the data is no longer needed, instead of sending an acknowledge signal back to the sender process, the receiver process resets the input tokens itself by pulling the data wires low through NMOS transistors as illustrated in FIG. 18. There are as many NMOS discharge transistors as there are data wires, but for simplicity, only one discharge transistor is shown in FIG. 18. As the data wires are pulled low, the sender detects the token consumption and gets ready to send the next token. Hence, eliminating the transitions associated with second part of the four phase protocol.

There has been very limited work on single-track handshake templates. Most of the prior work has focused on using single-track handshake protocol to reduce the cycle time of asynchronous pipelines to less than 10 transitions and not on how to use these extra transitions to improve logic density and energy efficiency. Ferretti et al. provide a family of asynchronous pipeline templates based on single-track handshake protocol. Just like high throughput QDI circuits, each of their pipeline templates contains only a small amount of logic. Furthermore, their 6-transition cycle time pipelines use some very tight timing margins that may require significant post-layout analog verification. Single-track circuits have been used in the control path of GasP bundled-data pipelines. However, the actual data path of the GasP bundled-data pipeline does not use a single-track handshake protocol.

In the embodiments of these teachings that employ single track handshake protocol for the pipeline templates focus on increasing the logic density and energy efficiency of each pipeline stage and not on reducing cycle time.

Figure 19:
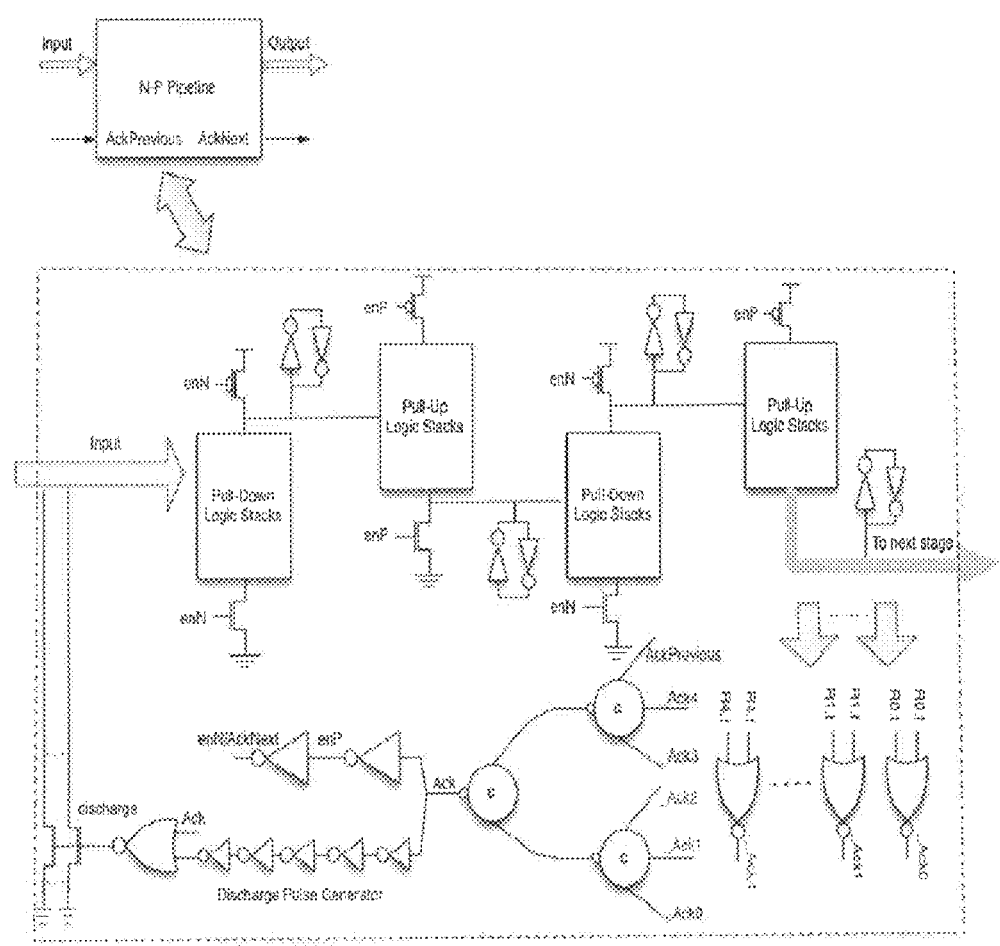
FIG. 19 is a schematic circuit diagram representation of an N-P pipeline template of these teachings.

Embodiments of pipeline templates using a single-track handshake protocol are disclosed herein below. FIG. 19 shows a semi detailed depiction, of our first proposed template with 5 arbitrary dualrail outputs indicated by signals R0 to R4. The template shown here in is referred to as an N-P pipeline since it computes logic using NMOS pull-down and PMOS pull-up stacks. Each NMOS and PMOS stage can comprise multiple logic stacks. However, for simplicity, multiple logic stacks and global reset signals are not shown, A PCeHB template has two logic stages per each pipeline, with the second logic stage comprising an inverter to drive the output rails. Hence, there is only one effective logic computation per pipeline block. In contrast, the N-P template has N arbitrary stages of actual logic computations. However, for ease of explanation and to keep cycle time within 18 transitions, N-P pipelines with four stages of logic are used in the exemplary embodiment shown in FIG. 19. In the reset state, the NMOS logic nodes in the pipeline are precharged, whereas the PMOS logic nodes are pre-discharged. Each state-holding gate includes a staticizer, which comprises a keeper and a weak feedback inverter, to ensure that charge would not drift even if the pipeline were stalled in an arbitrary state. The staticizers, drawn as two cross-coupled inverters, for the intermediate as well as the final output nodes are shown in FIG. 19. When 1-of-N encoded input tokens arrive, logic is computed in the first stage by pulling down the precharged nodes. This is similar to how logic is computed in QDI templates. In the exemplary embodiment, the number of series transistors in an NMOS stack is limited to a total of four. The second logic stage uses a stack of PMOS transistors to compute logic by pulling up the pre-discharged nodes. As the PMOS transistors have slower rise times, for throughput purposes, the number of series transistors in a PMOS stack is limited to a total of three (including the enable). As the output nodes from the second stage pull up, the pull-down stacks in the third stage get activated and compute logic by pulling down their output nodes. Finally, the fourth stage computes logic by using its pull-up stack of PMOS transistors. The four cascaded stages of logic in the pipeline shown in FIG. 19 are similar to cascaded domino logic but without any static inverters in between dynamic logic stages.

There are no explicit validity detection gates for the arriving input tokens nor for any intermediate outputs that are being produced. AckPrevious (explained later below) signifies the validity of input tokens into the pipeline and alleviates the need to explicitly check for validity. For intermediate outputs produced and consumed within the template, validity must be embedded in a pull-up or pull-down logic stack that uses the intermediate output to compute the following stage logic output. This could incur additional cost, depending on the function being implemented. However, for a logic stack inherently embedded with input validity, for example a stack that computes the sum of two inputs, there is zero validity detection overhead. The elimination of explicit validity detection gates for input tokens and intermediate output nodes leads to considerable power savings and minimization of handshake overhead.

There is an explicit completion detection logic for all the outputs that eventually leave the pipeline, either at the end of the second stage or the fourth stage. The completion detection of the final outputs automatically signifies the validity of all intermediate outputs as well as that of all the initial input tokens into the N-P pipeline. The completion detection logic comprises a set of NOR gates and a c-element tree as shown in FIG. 19. Each of the c-element gates includes a staticizer in parallel. These staticizers are not shown for simplicity. The outputs from the NOR gates are combined using a c-element tree which de-asserts the Ack signal once all outputs are valid. This leads the discharge signal to go high, which initiates the reset of all input tokens. The discharge signal is only set for a short pulse duration. The de-asserted Ack signal also sets the enP signal to high which discharges all pull-up nodes in logic stage two. The enN signal is set low, which pre-charges all pull down notes in logic stages one and three. Since the neutrality of the internal nodes is not sensed, in one embodiment, a timing assumption on their transition is introduced. The discharge of input tokens with a short pulse signal, in one embodiment, introduces another timing assumption. In one exemplary embodiment, these two timing assumptions entail the following constraints:

The pull-down nodes must be fully precharged before enN goes high and pull-up nodes must be fully discharged before enP transitions low. This translates into a race condition of 1 pull-up/pull-down transition versus 9 gate transitions, the minimum transition count before both enN and enP flip when two N-P pipelines are in series.

All input tokens must be fully discharged within the short pulse discharge period. The pulse has a minimum period of 5 gate transitions. There are as many NMOS discharge transistors as there are input data rails.

The robustness of the pipeline template of these teachings is not compromised as these timing assumptions satisfy the minimum timing constraint of at least 5 gate transitions between any two relative path delay rails. (Further details of the N-P and N-Inverter pipeline template embodiments are disclosed in Basit Riaz Sheikh and Rajit Manohar, Energy-Efficient Pipeline Templates for High-Performance Asynchronous Circuits, ACM Journal on Emerging Technologies in Computing Systems, Vol., No., Article A, Pub date: December 2011, which is incorporated by reference herein in its entirety and for all purposes.)

The senses of the inputs and outputs could be inverted by changing the order of the logic stacks within N-P pipeline. With inverted inputs, the first stage comprises PMOS logic stacks and the final logic stage comprises NMOS logic stacks with the outputs produced in inverted sense. This could improve the drive strength of the output signals especially in the case of high fan-out.

Figure 20:
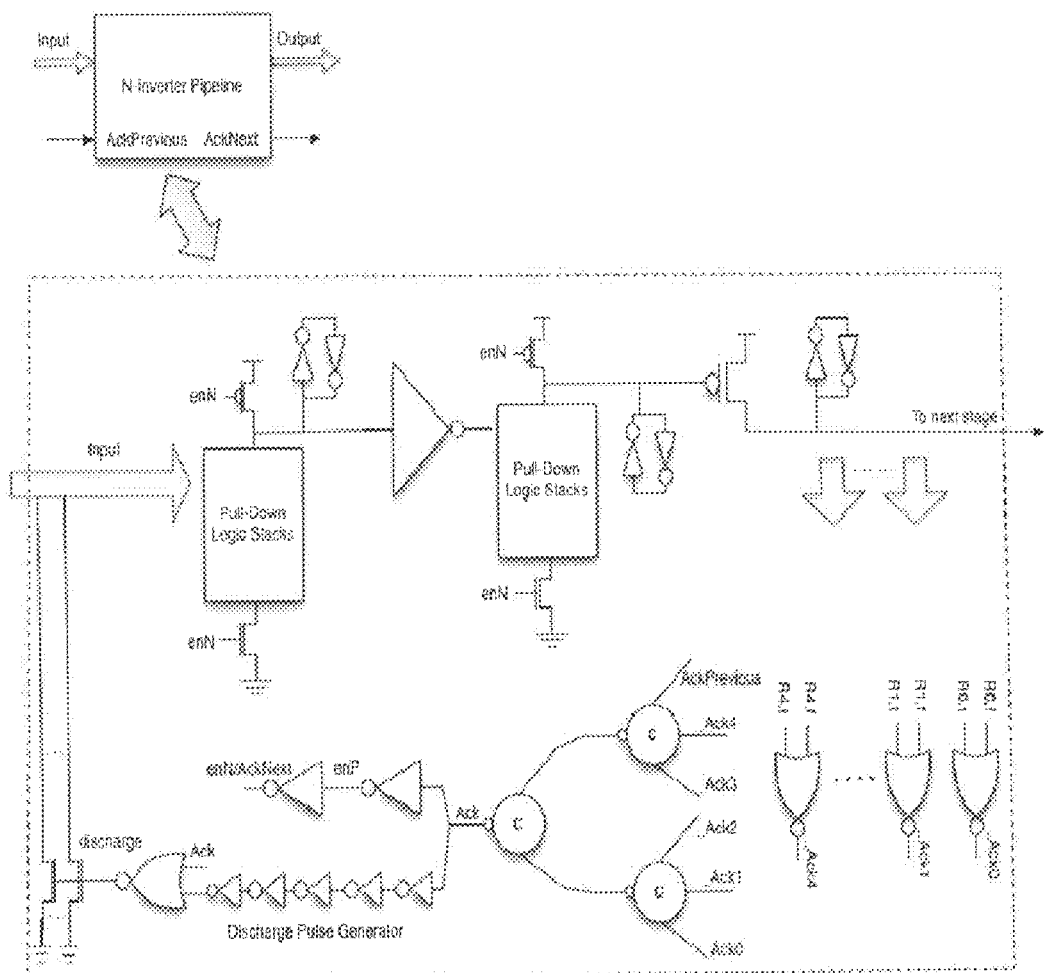
FIG. 20 is a schematic circuit diagram representation of an N-inverter pipeline template of these teachings.

In another embodiment of the pipeline template of these teachings, the PMOS pull-up logic stacks in stage 2 is replaced with an inverter, that embodiment being referred to as the N-Inverter template, and includes only a single pull-up PMOS transistor in stage 4 as shown in FIG. 20. As PMOS logic stacks have slower rise times and relatively weak drive strength, the N-P template cycle time may incur a performance hit. The N-Inverter template addresses this by using inverters with faster switching time and strong drive strength. It also results in better noise margins. However, these improvements come at the cost of reduced logic density as stage 2 and 4 no longer perform any effective logic computation. Despite these alterations, the N-Inverter and N-P templates use exactly the same timing assumptions. The completion detection and handshake circuitry is also identical.

In order to further elucidate the use of pipeline templates with a single track handshake protocol in one exemplary embodiment of double precision floating point asynchronous multipliers, embodiments of 8×8-bit booth encoded array of multipliers using asynchronous pipelines are presented below. To achieve high throughput and low latency in high-performance multipliers, most high performance chips use some form of Booth encoded array multiplication hardware. The array multiplier architecture requires a large number of tokens to be in flight at the same time. Each multiplication operation produces a number of partial products which are then added together to produce the final product. In terms of its usefulness to a wide-range of applications and significant circuit complexity, a high throughput array multiplier is a good candidate to effectively highlight the trade-offs between PCeHB and single-track handshake protocol pipeline templates of these teachings. The exemplary embodiments presented below, focus on improving energy efficiency by packing considerable logic within each pipeline stage, even at the cost of incurring throughput degradation of up to 25% compared to PCeHB style pipelines.

Figure 21:
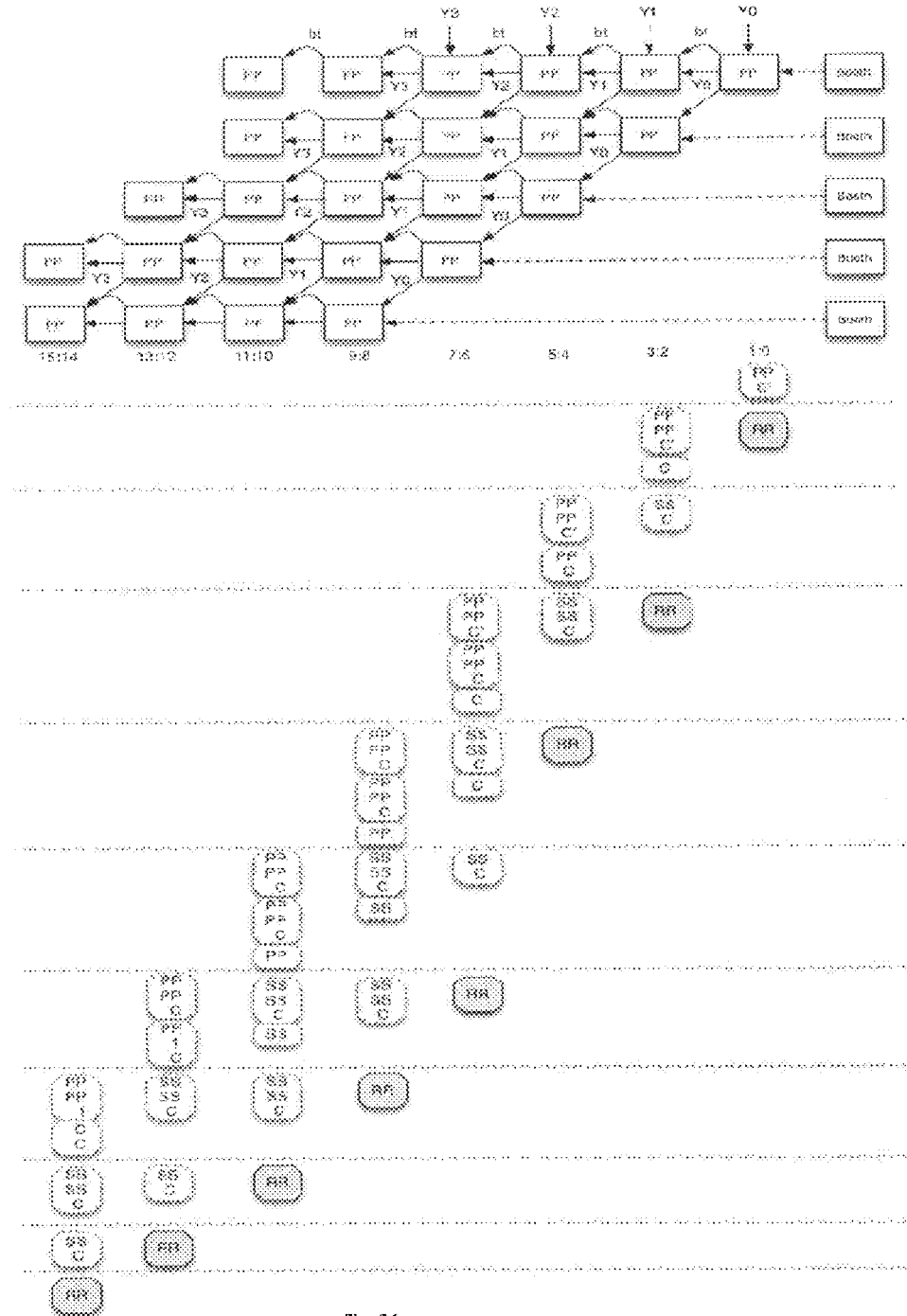
FIG. 21 is a block diagram representation of an 8×8 bit multiplier architecture using PCeHB pipelines.

An 8×8-bit radix-4 booth-encoded array multiplier is encoded (at the transistor level) using PCeHB pipelines to act as a baseline. FIG. 21 shows the top-level specification of an 8×8-bit multiplier of these teachings. The top part of FIG. 21 shows the partial product generation for the array multiplier. Each of the Y inputs is in a radix-4 format. The multiplicand bits are used to generate the booth control signals for each partial product row. Since a PCeHB pipeline can only compute a small amount of logic, each of the rectangular boxes labeled PP represents a separate pipeline stage. The booth control signals and multiplier input bits are sent from one pipeline stage to another, while each pipeline stage produces a two bit partial product.

The second half of FIG. 21 shows the order in which the partial products are produced and summed up. The horizontal dotted lines separate different time periods.

Each of the dotted polygons represent a separate PCeHB pipeline stage. The entries inside each polygon represent the inputs which are added together to produce the sum and carry outputs for the next pipeline stage. PP stands for two-bit partial product entry, C' corresponds to sign bit for each partial product row, SS stands for two-bit sum output from a previous stage, and C stands for a single-bit carry output from a previous stage sum computation. The final product bits are generated in a bit-skewed fashion, indicated by the symbol RR. Hence, slack-matching buffers need to be added on the outputs as well as some of the inputs to optimize the multiplier throughput. For simplicity, these slack-matching buffers are not shown in FIG. 21. The baseline multiplier is highly pipelined but contains very little logic in each pipeline stage. While this helps to achieve a very high throughput of 18 transitions per cycle, there is a large handshake overhead per each pipeline stage. To quantify the energy efficiency and other characteristics of our proposed low handshake pipeline templates, similar full transistor level 8×8-bit radix-4 booth-encoded array multipliers were implemented using N-P and N-Inverter pipeline templates.

Figure 22:
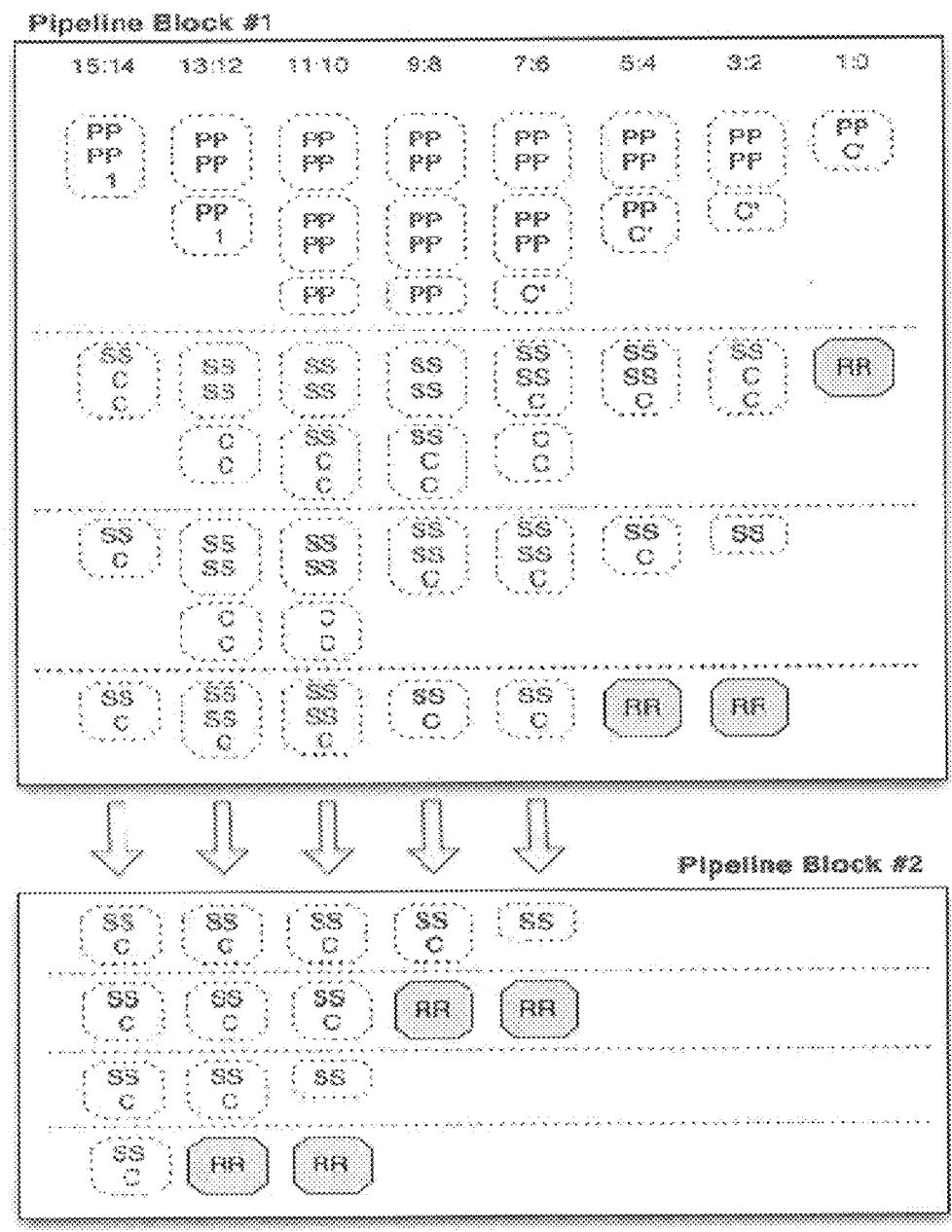
FIG. 22 is a block diagram representation of an 8×8 bit multiplier architecture using N-P pipelines.

FIG. 22 shows an overview of N-P pipelines and their logic stacks for the 8×8-bit array multiplier. Both N-P pipelines have four stages of logic. The first stage of the first pipeline generates all partial product entries. This is clearly a big power saving, as booth control signals and multiplier inputs need to be generated only once and not for each separate pipeline block as in the PCeHB implementation. Each dotted polygon represents a logic stack and not a separate pipeline stage, which leads to very high logic density in each pipeline block. Each RR, SS, and C signal represents a single output channel, which translates into 14 outputs for the first N-P pipeline block and 4 outputs for the second N-P block. The N-Inverter pipeline implementation, not shown for the sake of brevity, requires twice as many pipeline stages as N-P implementation since no effective logic computation is performed in its PMOS pull-up stacks. However, the rest of the design is similar to N-P pipeline implementation with consider able logic within each pipeline stage.

In contrast to the large number of fine-grain pipeline blocks in the PCeHB implementation, two N-P and four N-Inverter pipeline stages are needed to implement the bulk of 8×8-bit multiplication logic. The inputs to the first pipeline for both N-P and N-Inverter implementations are four radix-4 multiplier bit entries and booth control signals for all rows, which are generated separately using PCeHB style pipelines.

Since PCeHB pipelines follow a four phase handshake protocol, four phase to single-track conversion templates are used. For the sake of brevity, the conversion templates are not shown. For pipeline blocks with more than nine outputs, a wide NOR completion detection scheme is used. For outputs destined for the same pipeline block, only the neutrality of one of the outputs going to the second pipeline is tracked. This optimization greatly reduces the complexity of RST circuitry, reduces power consumption, and increases the throughput by up to 6.3% for our proposed pipeline templates. To highlight the seamless integration of N-P and N-Inverter pipelines within any four phase handshake environment, the resultant product outputs is converted into four phase 1-of-4 encoding.

In the exemplary embodiment of the double precision multiplier, although the radix-8 multiplier reduces the number of partial products bits by 31.3% compared to a radix-4 implementation, it still needs to produce and sum over 1050 partial product bits. As discussed here in above, the standard PCeHB pipelines, though very robust, consume considerable power in handshake circuitry, which gets worse as the complexity of PCeHB templates increases with more input and output bits. The handshake overhead, in a two-bit full adder PCeHB pipeline implementation, is as high as 69% of the total power consumption. Therefore, for circuits with large number of inputs, intermediate and final outputs, such as a multiplier array, the PCeHB pipelines represent a non-optimum choice from energy efficiency perspective.

N-Inverter pipeline templates, presented herein above, are used to implement the exemplary embodiment of the multiplier array. An N-Inverter pipeline reduces the total handshake overhead by packing multiple stages of logic computation within a single pipeline block, in contrast to PCeHB template which contains only one effective logic computation per pipeline. The handshake complexity is amortized over a large number of computation stacks within the pipeline stage. In Basit Riaz Sheikh and Rajit Manohar, Energy-Efficient Pipeline Templates for High-Performance Asynchronous Circuits, ACM Journal on Emerging Technologies in Computing Systems, Vol., No., Article A, Pub. date: December 2011, it is shown that compared to a PCeHB pipelined implementation the N-Inverter pipelines can reduce the overall energy consumption by 52.6% while maintaining the same throughput. These improvements come at the cost of some timing assumptions and require the use of single-track handshake protocol. The design tradeoffs associated with N-Inverter templates are discussed extensively in Basit Riaz Sheikh and Rajit Manohar, Energy-Efficient Pipeline Templates for High-Performance Asynchronous Circuits, ACM Journal on. Emerging Technologies in Computing Systems, Vol., No., Article A, Pub. date: December 2011.

Figure 23:
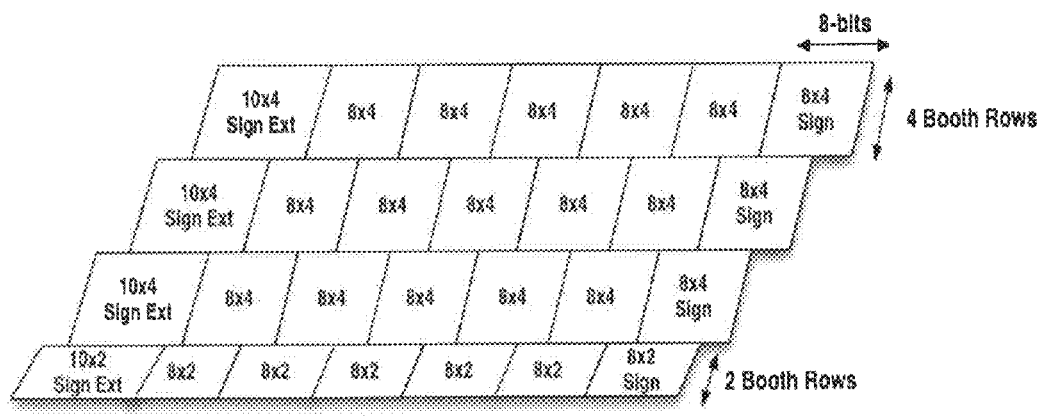
FIG. 23 is a schematic representation of the block level pipeline breakdown in a Radix-8 multiplier array of these teachings.

The block-level pipeline breakdown of the radix-8 multiplier array of these teachings is depicted in FIG. 23. The granularity at which the array is split is critical from both performance and energy efficiency perspective. The N-Inverter templates allow us to pack considerable logic within each stage, which helps to reduce the handshake associated power consumption significantly. However, as the number of logic computations within a pipeline block increase, so do the number of outputs. With more outputs, although the number of transitions per pipeline cycle remain the same with the use of wide NOR completion detection logic, each of these transitions incur a higher latency, as shown above. The choice of 8×4 pipeline blocks, with 15 outputs per each stage, was made to provide a good balance of low power and high throughput. The pipeline block labeled 8×4 Sign is identical to an 8×4 block except that it includes a sign bit for each partial product row. The sign bit acts as an input of one in the least significant position for any of the cases involving a complemented partial product multiple of −Y, −2Y, −3Y, or −4Y. The pipeline blocks labeled 10×4 Sign Ext are similar in design to the frequent 8×4 block, except that it provides support for sign extension bits required for supporting complemented multiples. The 8×2 block is a reduced version of an 8×4 block with only two booth rows. The similarity between these different pipeline blocks and the frequent use of the 8×4 pipeline block provides us with great design modularity, which helped to reduce the overall design effort required to optimize the multiplier array for throughput and energy efficiency.

Figure 24:
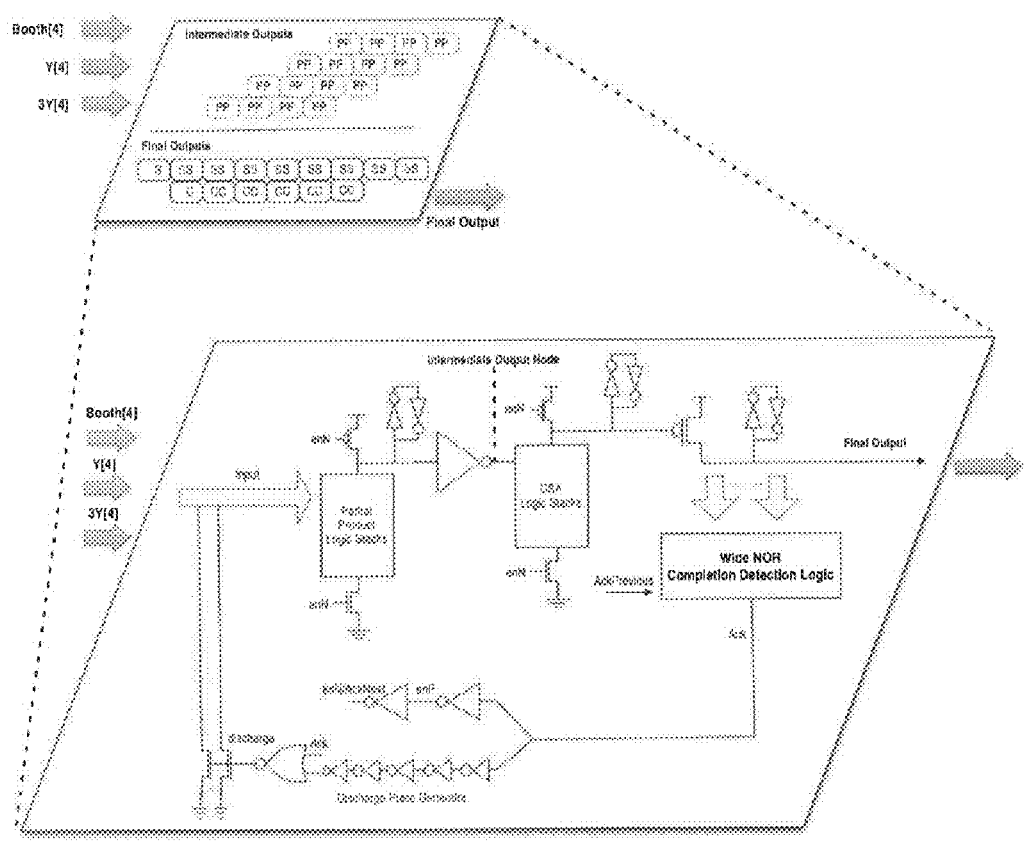
FIG. 24 shows the intermediate and final logic outputs within an 8×4 block in the Radix-8 multiplier array of these teachings.

Due to the similarity between different pipeline blocks, the details of the 8×4 block are presented. Each 8×4 pipeline block receives Booth-control, Y and 3Y input tokens. The eight bits of Y and 3Y inputs are encoded as four 1-of-4 tokens each. FIG. 24 shows the intermediate and final logic outputs within an 8×4 pipeline. It also shows the corresponding mapping of these outputs to a simplified circuit level depiction of an N-Inverter pipeline template. The NMOS stacks in the first stage compute four rows of eight bit partial product terms in inverted sense. These inverted outputs drive the inverters in the second stage of the pipeline block to produce corresponding partial product, PP, outputs. The next stage of NMOS stacks implements carry-save addition logic to sum and reduce these four rows of partial products to two rows of inverted sum and carry outputs. These inverted outputs drive the PMOS transistors in the last stage to produce sum and carry outputs, SS and CC, in correct sense for the following pipeline blocks.

For array multiplication, all pipeline blocks have to be in operation in parallel. The parallel operation requires multiples copies of input tokens to be consumed simultaneously by multiple pipeline blocks. For example, each booth control token is required in seven different pipeline blocks. To facilitate this, multiple copy stages are included prior to initiating the array computation. These copy blocks generate the desired number of copies for each input token. These tokens are then forwarded to the pipeline blocks which consume them to produce sum and carry outputs.

The next computation step is the summation of the large number of SS and CC outputs that are produced in parallel. This summation step is commonly referred to as reduction tree in arithmetic literature. A reduction tree basically employs 3:2 counters, often referred to as carry-save-adders (CSAs), to sum and reduce three inputs to two outputs at each stage of the tree. Within a few stages, the large number of tokens spanning over many partial product rows are reduced to mere two 106-bit long rows, which are finally summed using a carry-propagation adder. A full 3:2 counter reduction tree is implemented using multiple N-Inverter pipeline blocks. The NMOS stacks within each block implement carry-save addition logic. In terms of logic density, each pipeline block was restricted to produce no more than 1.5 outputs to maintain cycle time similar to 8×4 pipeline blocks.

The N-Inverter templates use single-track handshake protocol. As a result, the input tokens are first converted from four-phase handshake protocol into single-track protocol using conversion templates. This adds an additional logic stage to the FPM datapath latency. Since the final carry-propagation adder uses four-phase handshake protocol, the output tokens from the reduction tree are converted back to four-phase protocol. The latency of this conversion stage is hidden by implementing the final stage of the reduction tree within these conversion templates.

Figure 25:
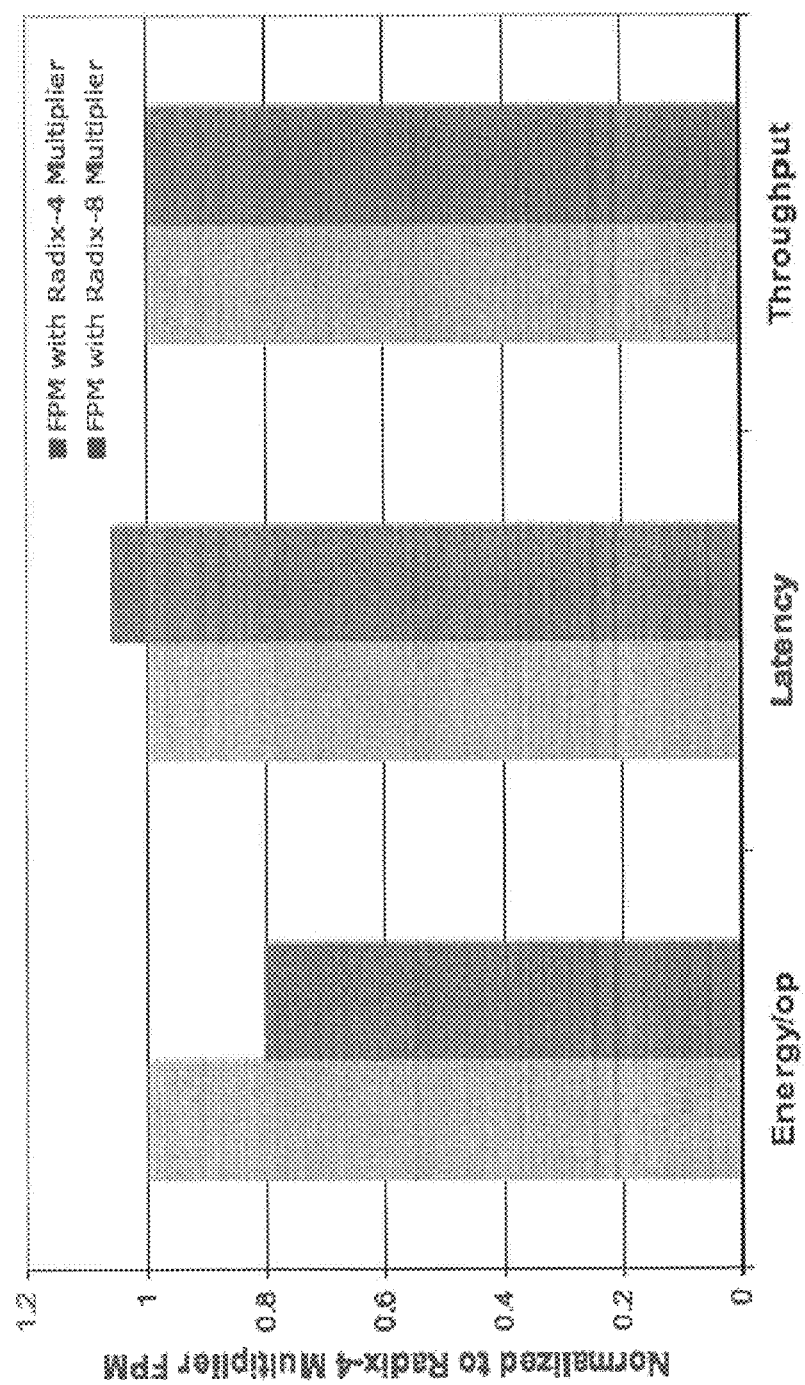
FIG. 25 shows energy, latency and throughput estimates for floating-point multipliers of these teachings.

The energy, latency, and throughput estimates of FPM implementations with radix-4 and radix-8 array multipliers are presented in FIG. 25. The results are normalized to FPM datapath with a radix-4 multiplier. The 31.3% reduction in the number of partial product bits translates into 19.8% reduction in energy per operation. But this improvement in energy efficiency comes at a cost of 5.9% increase in the FPM latency because of the 3Y partial product computation that needs to determined prior to initiating the multiplier array logic. A part of the 3Y computation latency is masked within booth control token-generation and copy pipelines. Since the radix-4 multiplier requires one extra computation stage in the reduction tree compared to a radix-8 multiplier implementation, the latency overhead of the 3Y computation can be further hidden. The 5.9% latency increase is attributed to the 3Y multiple computation part which is not masked. Despite the increase in latency, the throughput for both implementations remains the same due to sufficient slack availability within the interleaved The choice of a particular multiplier implementation represents a design trade-off. Since one goal to optimize for energy consumption and throughput, the radix-8 multiplier implementation is used in the double precision FPM exemplary embodiment.

In the double precision FPM exemplary embodiment, the multiplier array outputs two rows of 106-bit long partial sum and carry terms. The next step is to compute the 53-bit mantissa of the FPM output. This requires the summation of the most significant 53-bits of the two incoming partial sum and carry terms using a carry-propagation adder (CPA) The least significant 53-bits of the partial sum and carry terms are needed to compute the carry input into the CPA as well as the guard, round, and sticky terms required during the rounding step.

Figure 26:
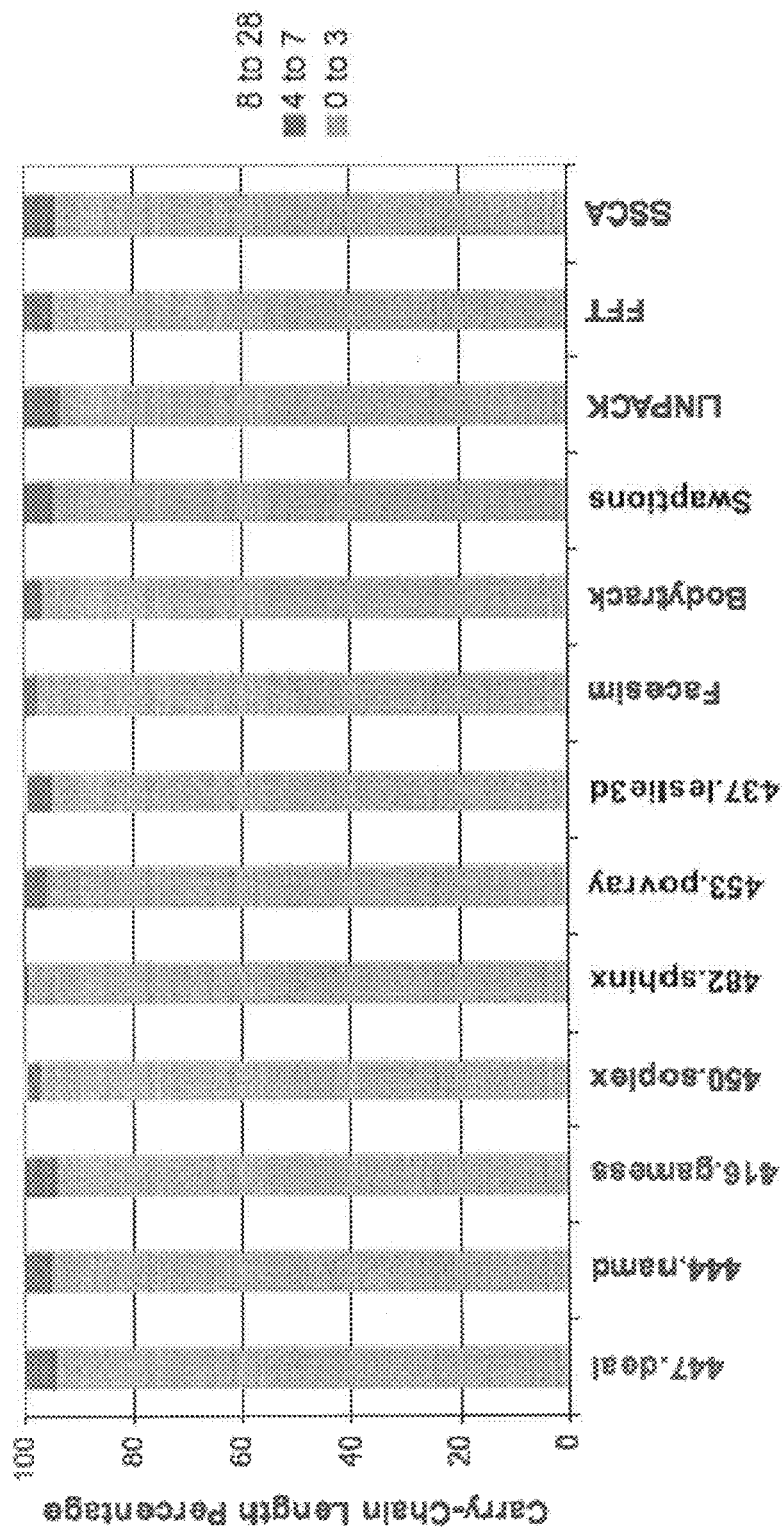
FIG. 26 shows longest ripple-carry length for computing CPA carry input in floating-point multipliers.

The multiplier array requires relatively less number of summation steps to produce its least significant output bits. This is because there are less partial product terms to be summed since each successive partial product row is skewed by three bit positions from the previous one in radix-8 multiplication. As a result, the least significant bits are available relatively earlier than rest of the multiplier array outputs. The fine-grain pipelining of these teachings is advantageously used by initiating the carry computation as soon as the least significant bits arrive. Furthermore, the application profiling results in FIG. 26 show that for over 90% operations across all applications the longest ripple-carry length to compute the carry input term is less than four radix-4 bit positions. These average-case patterns indicate that the carry term could be computed well in time for the CPA operation, hence alleviating the need of any speculative CPA implementations him up for the as is usually done in the case of most high performance synchronous FPMs.

Figure 27:
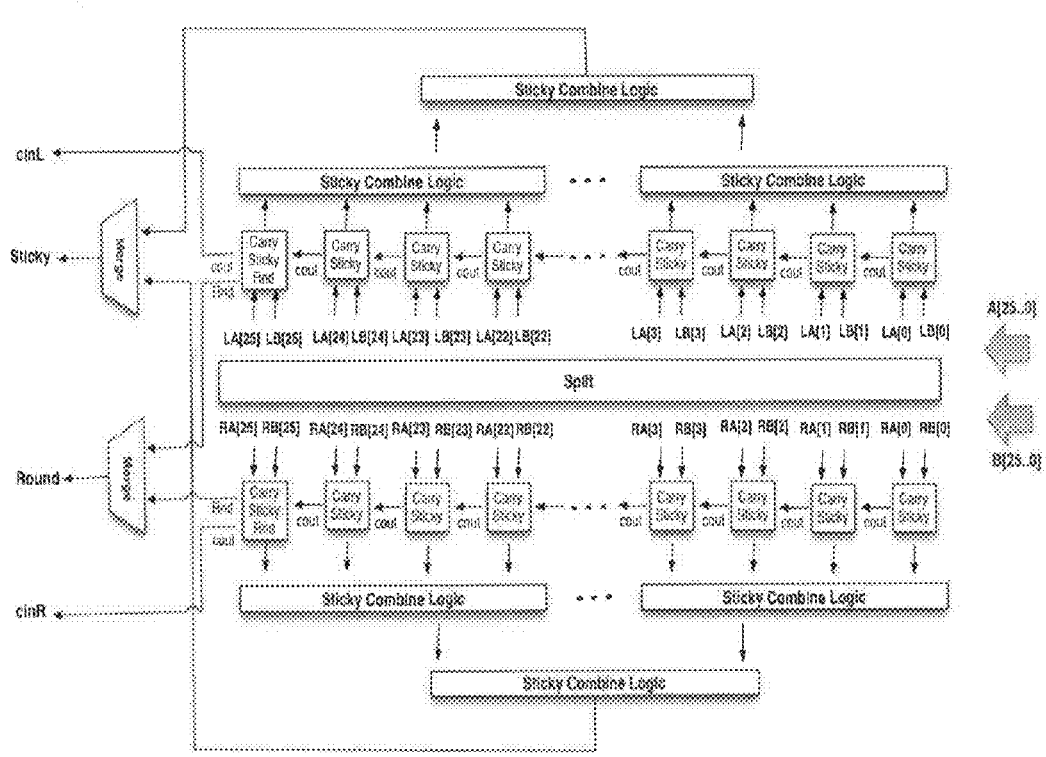
FIG. 27 is a schematic representation of the carry, sticky bit component of these teachings.

The micro-architecture of carry and sticky-bit computation is depicted in FIG. 27. It uses interleaved split and merge pipelines, first introduced with the design of interleaved adder shown in FIG. 15. The inputs A and B in FIG. 27 are in one-of-four encoded format and correspond to 52 least significant bits of partial sum and carry output terms from the multiplier array. The odd data tokens are sent on the output channels labeled with R prefix, while the next arriving even data tokens are sent on channels with L prefix. Each Carry Sticky block computes the carry and sticky bit terms at that bit position. With carry chain lengths of less than four, as seen if FIG. 26, the final carry term is computed within four logic levels on average. This represents logarithmic average latency. The odd tokens are used to compute the carry term cinR used as carry input in the odd ripple-carry adder of our interleaved CPA, whereas the next arriving even data tokens compute the carry term cinL used as carry input in the even ripple-carry adder of the interleaved CPA topology of these teachings.

For sticky-bit computation, a parallel tree topology is used that combines bitwise sticky-bit values to compute the final sticky-bit. A ripple flow architecture similar to the one used to compute carry input term was deemed not feasible as it yielded consistently long ripple chains, which caused throughput degradation. The interleaved topology of these teachings prevents throughput degradation up to ripple lengths of 14 bit positions only. Frequently, the application profiling results yield ripple lengths of 15 or more. The sticky-bit is set to one if any of the bits is one, but for it to be set to zero it has to ensure that all prior bits in the sequence are zero. This is what causes the long ripple chains and renders ripple-flow design infeasible.

The timing flexibility of the underlying asynchronous circuits of these teachings is utilized by using interleaved adder topology for the 53-bit carry-propagation adder design. The interleaved adder comprises two ripple-carry adders. The adder topology is identical to the one used earlier for 3Y multiple computation. In these teachings, the choice of the interleaved adder was made on the basis of application profiling results, which indicate very small carry chain lengths on average across all application benchmarks. It yields average throughput similar to that attained, with expensive tree adder designs while consuming up to 4× less energy per operation.

While discussing the various trade-offs involved in the FPM datapath design, certain special cases specified in the IEEE format have not been discussed. Two of these special cases: the denormal numbers and underflow case represent the most difficult operations to implement in an PPM datapath. The scenarios under which these two special cases arise and the tasks that need to be performed are summarized as follows:

One of the FPM inputs is a denormal number, which yields a mantissa with zeroes in its most significant bit positions. If the non-bias exponent for the product is greater than the minimum value of one, the product needs to be left shifted while decrementing the exponent until it is normalized or the exponent reaches the value of one. This scenario is referred to as the Denormal case.

One of the FPM inputs is a denormal number or both PPM inputs are very small numbers and the resulting exponent is less than the minimum value of one. In this case, the mantissa needs to be right shifted. The value of right shift is equal to the difference between the minimum value and resulting exponent or an amount which zeroes out the mantissa, whichever of the two is smaller. This scenario is referred to as the Underflow case.

The need of variable left shift and right shift logic blocks makes the hardware support for denormal and underflow cases expensive. However, the infrequent occurrence of these special case inputs and the extensive hardware complexity required to support these operations has meant that many FPM designs do not fully support these operations in hardware. Instead, these operations are implemented in software via traps. This yields very long execution time. It also means that the FPM hardware is no longer fully IEEE compliant.

In the exemplary embodiment, serial shifters are used to provide full hardware support for these special case inputs. Using conditional split pipelines, the output bits from the CPA are directed to either Normal or Denormal/Underflow logic path. The Normal datapath includes single-bit normalization shift block and rounding logic. The Denormal/Underflow unit comprises serial left and right shift blocks and a combined rounding block. For input tokens diverted to the Normal datapath, no dynamic power is consumed within the Denormal/Underflow block and likewise for input tokens headed for Denormal/Underflow block, there is no dynamic power consumption in the Normal datapath. In contrast, synchronous design requires significant control overhead to attain fine-grain clock gating.

Figure 28:
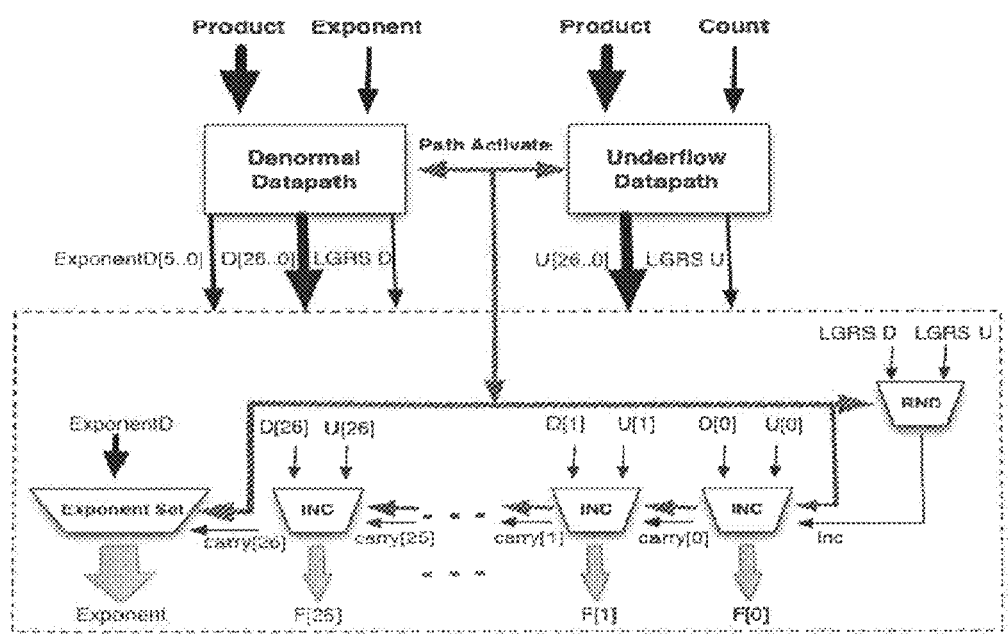
FIG. 28 is a schematic representation of the rounding component of these teachings.

Once the mantissa has been correctly aligned using variable left or right shift block, a subsequent rounding operation may be required to increment the 53-bit mantissa by one. Ripple-carry 1-of-4 encoded increment logic is used to implement rounding. An expensive increment logic topology would have been futile since the output from variable shift blocks arrives in bitwise fashion. The rounding logic is shared between the Denormal and Underflow datapaths as shown in FIG. 28 to further minimize the area overhead of supporting these special case operations. The Rnd block receives incoming guard, round, sticky, and rounding mode bits from both special case datapaths. It selects the correct set of inputs to determine whether to increment the mantissa or not.

Figure 29:
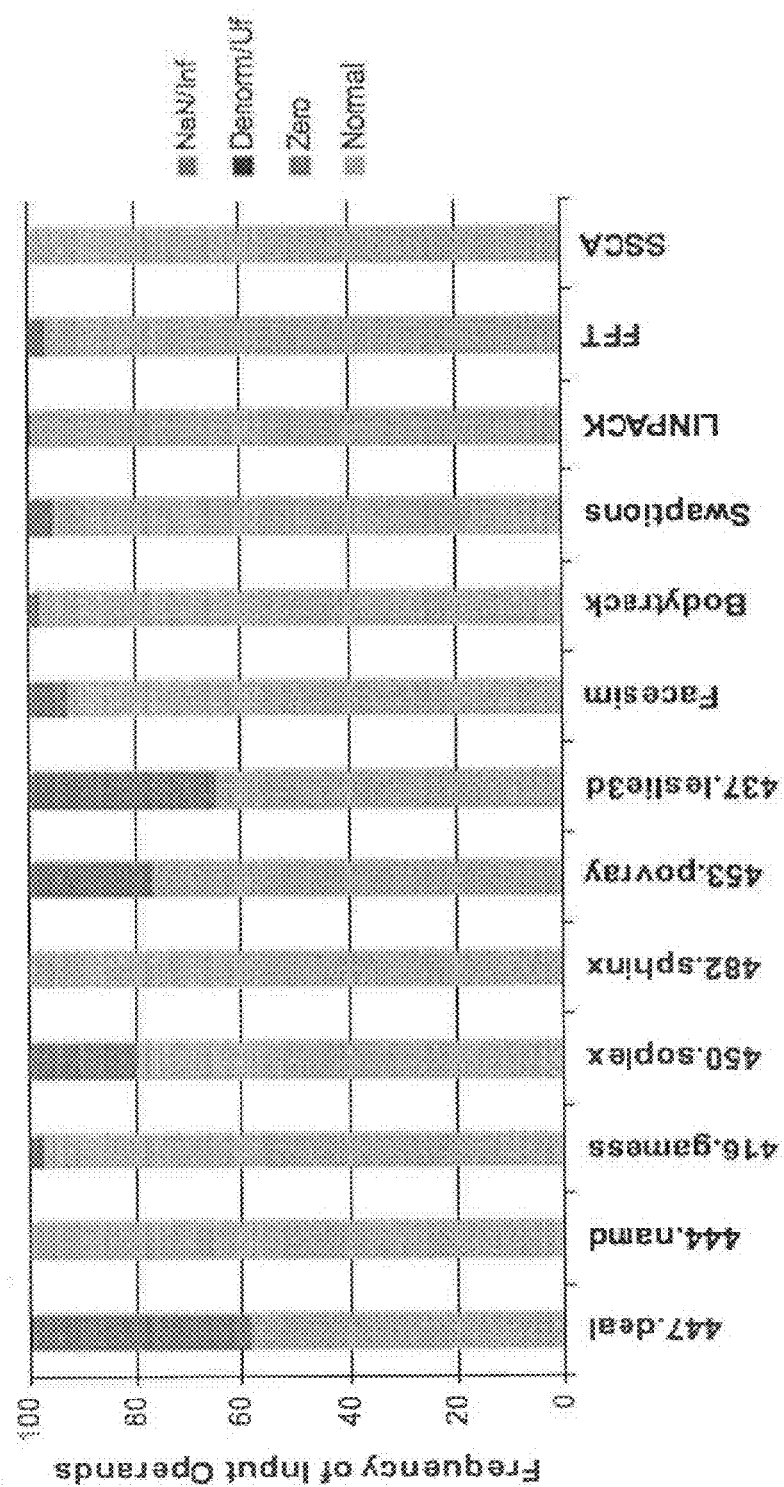
FIG. 29 is a graphical representation of Operand profile of floating-point multiplication instructions in floating-point multipliers.

Prior to the final Pack pipeline, there is a merge pipeline stage that selects the output from either the Normal or the Denormal/Underflow datapath. Since these special case inputs happen very infrequently as shown in FIG. 29, the throughput degradation due to the use of serial shifters does not affect the average FPM throughput.

Operand profile of floating-point multiplication instructions reveals that a few application benchmarks have a significant proportion of zero input operands. These primarily include applications with sparse matrix manipulations, such as 447.deal and 437.leslie3d, despite their use of specialized sparse matrix libraries. For other benchmarks, the zero-input percentage varies widely as shown in FIG. 29. In most state-of-the-art synchronous FPM designs, the zero-input operands flow through the full FPM datapath. They yield similar latency and consume same power as any other non-zero operand computation. This is highly non optimum since if one or both of the PPM operands are zero, the final zero output could be produced much earlier and at much reduced energy consumption by skipping most of the compute intensive power consuming logic blocks such as the multiplier array, carry propagation adder, normalization, and rounding unit.

In one embodiment, a zero bypass path in the PPM datapath is provided to optimize the latency and energy consumption in the case of zero operands. To activate the bypass path, the FPM utilizes the zero flag control output from Unpack stage, which checks if any of the input operands is zero. But this information is not available in time before the start of pipeline stages pertaining to Booth control and 3Y multiple generation. One possible solution was to delay these pipeline stages until the zero flag is computed and then use it to divert the tokens to either the regular or the bypass path. Since this solution incurs a latency hit for non-zero operands, it was discarded. In one exemplary embodiment, instead of delaying the multiplier array, the flow of tokens is inhibited much deeper in the datapath. As a result, in the exemplary embodiment, the energy footprint of zero operand computations includes the overhead of computing Booth control token as well as some parts of the 3Y multiple computation. But this still yields roughly 82% reduction in energy consumption for each zero operand computation, while preserving same latency and throughput for non-zero operand operations.

In one embodiment, the method of these teachings for improving energy efficiency of an asynchronous floating-point multiplier circuit, where the asynchronous floating-point multiplier is at least a radix-4 multiplier, includes using an interleaved adder for a 3Y partial product; and using a single track handshake protocol in each template in each asynchronous pipeline. In that embodiment, the interleaved adder includes two Radix-4 ripple adders, a left ripple adder and a right ripple adder, the two Radix-4 ripple adders being asynchronous circuits, a splitter pipeline receiving an input from Y partial product and a merge pipeline receiving output from each one of the two Radix-4 ripple adders.

In another embodiment, the method of these teachings for improving energy efficiency of an asynchronous floating-point multiplier circuit, where the asynchronous floating-point multiplier comprises a carry, round and sticky bit component, also includes using interleaved split and merge asynchronous pipelines in the carry, round and sticky bit component. In that embodiment, the split asynchronous pipeline receives two inputs, each one of the two inputs corresponding to half of least significant bits of partial sum and carry output terms from the array multiplier; odd data tokens being split to one stream of carry, stick bit calculation blocks; even data tokens being split to another stream of carry, stick bit calculation blocks; bitwise sticky bit values being merged to obtain a sticky bit output.

In yet another embodiment, the method of these teachings for improving energy efficiency of an asynchronous floating-point multiplier circuit, where the asynchronous floating-point multiplier circuit includes a carry propagation adder component, includes using an interleaved carry propagation adder in the carry propagation adder component.

In a further embodiment, the method of these teachings for improving energy efficiency of an asynchronous floating-point multiplier circuit, where the asynchronous floating-point multiplier has a rounding component for denormal/underflow cases, includes using a rounding component having a denormal data path component, an underflow data path component, each one of the denormal data path component and the underflow data path component including serial left and right shift blocks, and a rounding component including ripple-carry increment logic components.

In still a further embodiment, the method of these teachings for improving energy efficiency of an asynchronous floating-point multiplier circuit, wherein the asynchronous floating-point multiplier circuit has an unpacking component, an array multiplier component, a carry propagation adder component, a carry, round and sticky bit component and a round and normalization component, includes determining, using the unpacking component, whether any input is equal to zero and bypassing, if an input is determined to be equal to zero, the array multiplier component, the carry propagation adder component, the carry, round and sticky bit component and the round and normalization component.

The above described embodiments of the method of these teachings for improving energy efficiency are embodiments illustrating using operand characteristics for performance/energy optimization of a floating-point arithmetic unit where the floating-point arithmetic unit is an asynchronous floating-point multiplier.

In one embodiment, the method of these teachings for improving energy efficiency of an asynchronous floating-point multiplier circuit includes using a single track handshake protocol in each template in each asynchronous pipeline, asynchronous pipelines being used in components of the asynchronous floating-point multiplier circuit.

It should be noted that, although a number of exemplary embodiments have been presented in to elucidate these teachings, these teachings are not limited only to those exemplary embodiments.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. An asynchronous floating-point adder comprising:
a front end component receiving a first input and second input, the first and second input being described in exponent/significand form; said front end analyzing the first and second input and obtaining a difference between an exponent of the first input and an exponent of the second input; said difference comprising a difference in exponents;
an alignment shift component receiving the difference in exponents; the alignment shift component aligning significands of the first and second inputs when exponents are different; aligned significands being adder inputs;
an adder component receiving the adder inputs from said alignment shift component;
a leading one predictor (LOP)/decoder component receiving adder inputs from said alignment shift component;
a left shift/exponent adjustment determination component receiving an output of said adder component and an output of said leading one predictor/decoder component;
a right shift/exponent adjustment determination component receiving an output of said adder component; and
a left-right selection component; an output of said left-right selection component being utilized to provide an output of the asynchronous floating-point adder;
said front end component, said shifter component, said adder component, said leading one predictor (LOP)/decoder component, said left shift/exponent adjustment determination component, said right shift/exponent adjustment determination component and said left-right selection component utilizing quasi-delay insensitive (QDI) asynchronous circuits;
said front end component, said alignment shift component, said adder component, said leading one predictor (LOP)/decoder component, said left shift/exponent adjustment determination component, said right shift/exponent adjustment determination component and said left-right selection component being asynchronously pipelined; asynchronously pipelining enabling optimization of operand.

2. The asynchronous floating-point adder of claim 1 wherein said adder component comprises a Kogge-Stone Carry-Select adder.

3. The asynchronous floating-point adder of claim 1 wherein said adder component comprises an interleaved asynchronous adder, said interleaved asynchronous adder comprising two Ripple-Carry adders, a left Ripple-Carry adder and a right Ripple-Carry adder; said two Ripple-Carry adders being asynchronous circuits.

4. The asynchronous floating-point adder of claim 1 wherein said right shift, exponent adjustment determination component comprise a right pipeline and wherein said left shift/exponent adjustment determination component comprising a left pipeline; the left pipeline being utilized when destructive cancellation can occur during addition; the right pipeline being utilized when destructive cancellation cannot occur during addition; and wherein the asynchronous floating-point adder further comprises a pipeline selection component; said pipeline selection component in determining whether the right pipeline or the left pipeline is utilized.

5. The asynchronous floating-point adder of claim 1 wherein said adder component comprises a conditional invert component; said conditional invert component inverting bits when required for subtraction.

6. The asynchronous floating-point adder of claim 1 wherein said leading one predictor (LOP)/decoder component comprises a pre-LOP component determining a first operand for LOP operation.

7. The asynchronous floating-point adder of claim 6 wherein a conditional invert component is included in said pre-LOP component.

8. The asynchronous floating-point adder of claim 1 wherein said right shift, exponent adjustment determination component comprises a significand incrementer; and wherein said significand incrementer comprises an interleaved incrementer; said interleaved incrementer comprising:
  two ripple carry incrementers; a right ripple carry incrementer receiving odd numbered data tokens; a left ripple carry incrementer receiving a next arriving data token, if said left ripple carry incrementer is available; and
  an interleave merge component receiving an output of said right ripple carry incrementer and an output of said left ripple carry incrementer.

9. The asynchronous floating-point adder of claim 1 wherein said front end component determines whether any input is equal to zero; and wherein, if an input is determined to be equal to zero, said alignment shift component, said adder component, said leading one predictor (LOP)/decoder component, said left shift/exponent adjustment determination component, said right shift, exponent adjustment determination component and said left-right selection component are bypassed.

10. The asynchronous floating-point adder of claim 1 wherein said alignment shift component comprises:
  a first shift component for a shift between zero and a predetermined bit position;
  a second shift component receiving output of said first shift component for a shift greater than the predetermined bit position; and
  a merge component receiving output of said second shift component for a shift greater than the predetermined bit position and output of said first shift component for a shift between zero and the predetermined bit position.

11. A method for performing floating-point addition using an asynchronous floating-point adder circuit, the method comprising:
  using an interleaved asynchronous adder as an adder component in order to perform floating-point addition in the asynchronous floating-point adder circuit, the interleaved asynchronous adder comprising two Ripple-Carry adders, a left Ripple-Carry adder and a right Ripple-Carry adder;
  said two Ripple-Carry adders being asynchronous circuits.

12. The method of claim 11 further comprising
  selecting, where the asynchronous floating-point adder circuit has a two-path architecture, a right pipeline path and a left pipeline path, and comprises a leading one predictor (LOP)/decoder component in the left pipeline path, prior to activating the leading one predictor (LOP)/decoder component, a path from the left pipeline path and the right pipeline path.

13. A method for performing floating-point addition using an asynchronous floating-point adder circuit, the method comprising:
  using an alignment shift component, the alignment shift component aligning significands of first and second inputs to the asynchronous floating-point adder circuit when exponents are different, aligned significands being adder inputs for floating-point addition,
  the alignment shift component comprising:
  a first shift component for a shift between zero and a predetermined bit position;
  a second shift component receiving output of said first shift component for a shift greater than the predetermined bit position and output of said first shift component for a shift between zero and the predetermined bit position; an output of the first shift component being provided directly to the merge component if the shift is between zero and the predetermined bit position.

14. The method of claim 13 further comprising:
  simplifying a guard, round, sticky bit calculation due to shifting out at most a predetermined number of bits; and
  bypassing the guard, round, sticky bit calculation when the guard, round, sticky bit calculation is not required.

15. The method of claim 13 wherein the asynchronous floating-point adder circuit includes a significand incrementer; and wherein the method further comprises utilizing an interleaved incrementer as the significand incrementer.

16. The method of claim 15 wherein the interleaved incrementer comprises:
  two ripple carry incrementers; a right ripple carry incrementer receiving odd numbered data tokens; a left ripple carry incrementer receiving a next arriving data token, if said left ripple carry incrementer is available; and
  an interleave merge component receiving an output of said right ripple carry incrementer and an output of said left ripple carry incrementer.

17. The method of claim 13 wherein the asynchronous floating-point adder circuit includes a front end component; wherein said front end component determines whether any input is equal to zero; and wherein the method further comprises bypassing, when an input is determined to be equal to zero, a number of the floating-point adder components.

* * * * *

UNITED STATES PATENT AND TRADEMARK OFFICE
CERTIFICATE OF CORRECTION

PATENT NO. : 9,524,270 B2  
APPLICATION NO. : 13/663970  
DATED : December 20, 2016  
INVENTOR(S) : Manohar et al.

Page 1 of 1

It is certified that error appears in the above-identified patent and that said Letters Patent is hereby corrected as shown below:

In the Claims

Column 34, Line 52 Claim 4, delete "component in determining" and insert -- component determining --

Column 35, Line 18 Claim 9, delete "right shift, exponent" and insert -- right shift/exponent --

Column 35, Line 43 Claim 12, delete "further comprising" and insert -- further comprising: --

Signed and Sealed this  
Sixth Day of June, 2017

Michelle K. Lee  
*Director of the United States Patent and Trademark Office*